US009849811B2

(12) United States Patent
Kojima et al.

(10) Patent No.: US 9,849,811 B2
(45) Date of Patent: Dec. 26, 2017

(54) SEAT RECLINING DEVICE FOR VEHICLE

(71) Applicant: AISIN SEIKI KABUSHIKI KAISHA, Kariya-shi (JP)

(72) Inventors: Yasuhiro Kojima, Kariya (JP); Mikihito Nagura, Bangalore (IN); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/325,664

(22) PCT Filed: Jul. 6, 2015

(86) PCT No.: PCT/JP2015/069436
§ 371 (c)(1),
(2) Date: Jan. 11, 2017

(87) PCT Pub. No.: WO2016/009877
PCT Pub. Date: Jan. 21, 2016

(65) Prior Publication Data
US 2017/0158093 A1 Jun. 8, 2017

(30) Foreign Application Priority Data
Jul. 14, 2014 (JP) ................. 2014-144560

(51) Int. Cl.
B60N 2/235 (2006.01)
B60N 2/28 (2006.01)
A47C 1/025 (2006.01)
B60N 2/22 (2006.01)
B60N 2/225 (2006.01)

(52) U.S. Cl.
CPC ......... B60N 2/2358 (2013.01); B60N 2/2878 (2013.01); A47C 1/025 (2013.01);
(Continued)

(58) Field of Classification Search
CPC ........................... B60N 2/2358; B60N 2/2878
(Continued)

(56) References Cited

U.S. PATENT DOCUMENTS 8,033,607 B2   10/2011   Kojima et al.
8,985,690 B2 *  3/2015   Yamada ............... B60N 2/2358
                                                297/341
(Continued)

FOREIGN PATENT DOCUMENTS

JP   2010-22471 A   2/2010

OTHER PUBLICATIONS

U.S. Appl. No. 15/325,467, filed Jan. 11, 2017, Yasuhiro Kojima, et al.
(Continued)

Primary Examiner — Anthony D Barfield
(74) Attorney, Agent, or Firm — Oblon, McClelland, Maier & Neustadt, L.L.P.

(57) ABSTRACT

A vehicle seat reclining device is disclosed. An operation mechanism allows a second memory member to engage with and disengage from a first memory member, and locks and unlocks a lock member in conjunction with the engagement and disengagement. When the first memory member is in a predetermined rotational position relative to the second rotating member, the second memory member is inserted into an engagement slot provided in the first memory member, thereby restricting rotation of the first memory member relative to the second rotating member. The operation mechanism includes a link member that is linked to the second memory member inserted into a guide hole provided in a plate-shaped member. In the thickness direction of the plate-shaped member, the link member is arranged on the same side of the plate-shaped member as the first memory member.

7 Claims, 16 Drawing Sheets

(52) U.S. Cl.
CPC .............. *B60N 2/22* (2013.01); *B60N 2/2258* (2013.01); *B60N 2/235* (2013.01)

(58) Field of Classification Search
USPC .......................................... 297/367 P, 367 R
See application file for complete search history.

(56) References Cited

U.S. PATENT DOCUMENTS

| | | | |
|---|---|---|---|
| 2006/0012232 A1* | 1/2006 | Coughlin | B60N 2/2358 297/367 R |
| 2007/0096530 A1* | 5/2007 | Ohba | B60N 2/2358 297/367 R |
| 2007/0102981 A1* | 5/2007 | Pejathaya | B60N 2/20 297/367 R |
| 2013/0113260 A1 | 5/2013 | Kojima | |

OTHER PUBLICATIONS

U.S. Appl. No. 15/325,641, filed Jan. 11, 2017, Yasuhiro Kojima, et al.
U.S. Appl. No. 15/325,616, filed Jan. 11, 2017, Yasuhiro Kojima, et al.
International Preliminary Report on Patentability and Written Opinion dated Jan. 17, 2017 in PCT/JP2015/069436 (submitting English translation only).
International Search Report dated Sep. 8, 2015 in PCT/JP15/069436 Filed Jul. 6, 2015.

* cited by examiner

SEAT RECLINING DEVICE FOR VEHICLE

TECHNICAL FIELD

The present invention relates to a seat reclining device for a vehicle.

BACKGROUND ART

Patent Document 1 discloses a vehicle seat reclining device that includes a first and second rotating members and a locking member. The first rotating member is arranged coaxially with the second rotating member. The locking member is capable of limiting relative rotation between the first and second rotating members. The seat reclining device disclosed in Patent Document 1 further includes a first memory member and a second memory member. The first memory member frictionally engages with the outer surface of the first rotating member. The second memory member is capable of restricting the first memory member from rotating relative to the second rotating member by engaging with the first memory member at a predetermined relative rotation position. During so called the walk-in access enabling action, in which the seat back is folded forward to facilitate entry into and exit from the rear seat, the locking member is either locked or unlocked in conjunction with engagement/disengagement of the second memory member with the first memory member. This allows the seat back, which has been folded forward, to be returned to the inclined position at which the seat back was located before the forward folding operation.

That is, many of conventional seat reclining devices have an operation handle on the side of the seat. The operation handle is manipulated to cause the locking member to cancel the constraint between the first and second rotating members, so that the tilt angle of the seat back can be adjusted. At the normal reclining operation, the seat reclining device disclosed in Patent Document 1 causes the second memory member to engage with the first memory member to restrict the first memory member from rotating relative to the second rotating member. The first rotating member is allowed to rotate relative to the second rotating member by acting against the frictional engagement force between the first rotating member and the first memory member.

In contrast, at the walk-in access enabling action, the locking member is unlocked in conjunction with separation of the second memory member from the first memory member. That is, when the second memory member is separated from the first memory member, the first memory member and the first rotating member rotate integrally due to the frictional engagement force between the first memory member and the first rotating member. Then, when the forward folded seat back is raised, the second memory member is engaged with the first memory member at a predetermined relative rotation position, so that the seat back is returned to the inclined position at which the seat back was located before the forward folding operation.

The seat reclining device of Patent Document 1 employs a shaft-shaped memory pin as the second memory member. Further, the seat reclining device includes a plate-shaped member, which has an elongated guide hole for receiving the memory pin. One end of the memory pin is coupled to a link member. When receiving operational force via the link member, the memory pin is engaged with or disengaged from the first memory member.

PRIOR ART DOCUMENT

Patent Document

Patent Document 1: US Patent Application Publication No. 2013/0113260

SUMMARY OF THE INVENTION

Problems that the Invention is to Solve

In the above described configuration, the memory pin, which is received in the plate-shaped member, is likely to be inclined. This may displace the timing of action of the locking member interlocked with the memory pin. Such displacement of timing may apply load on the engaging parts of the locking member and the rotating members, resulting in noises and reduction in the durability. In this regard, there is room for improvement in the above described configuration.

Accordingly, it is an objective of the present invention to provide a seat reclining device for a vehicle that is capable of accurately engaging and disengaging memory members.

Means for Solving the Problems

To achieve the foregoing objective and in accordance with one aspect of the present invention, a seat reclining device for a vehicle is provided that includes a first rotating member, a second rotating member that is arranged coaxial with the first rotating member, a plate-shaped member to which the second rotating member is fixed, a locking member that restricts relative rotation between the first rotating member and the second rotating member, a first memory member, a second memory member, and an operation mechanism. The first memory member is capable of rotating coaxially and integrally with the first rotating member by frictionally engaging with an outer surface of the first rotating member and capable of rotating relative to the first rotating member against frictional engagement force between the first memory member and the first rotating member. The second memory member is capable of engaging with and disengaging from the first memory member. The operation mechanism causes the second memory member to engage with and disengage from the first memory member and selectively locks and unlocks the locking member in conjunction with the engagement and disengagement. The first memory member includes a sliding surface and an engagement slot. By sliding on the second memory member, the sliding surface restricts engaging action of the second memory member that is accompanied by the locking of the locking member. The second memory member can enter into the engagement slot. When the first memory member is at a predetermined relative rotation position with respect to the second rotating member, the second memory member is inserted into the engagement slot so that engaging action of the second memory member is allowed, thereby restricting relative rotation of the first memory member with respect to the second rotating member. The operation mechanism includes an elongated guide hole provided in the plate-shaped member, and a link member that is coupled to the second memory member inserted in the guide hole. The link member is arranged on the same side of the plate-shaped member as the first memory member in a thickness direction of the plate-shaped member.

MODES FOR CARRYING OUT THE INVENTION

A seat reclining device 10 according to one embodiment will now be described with reference to the drawings.

Figure 1:
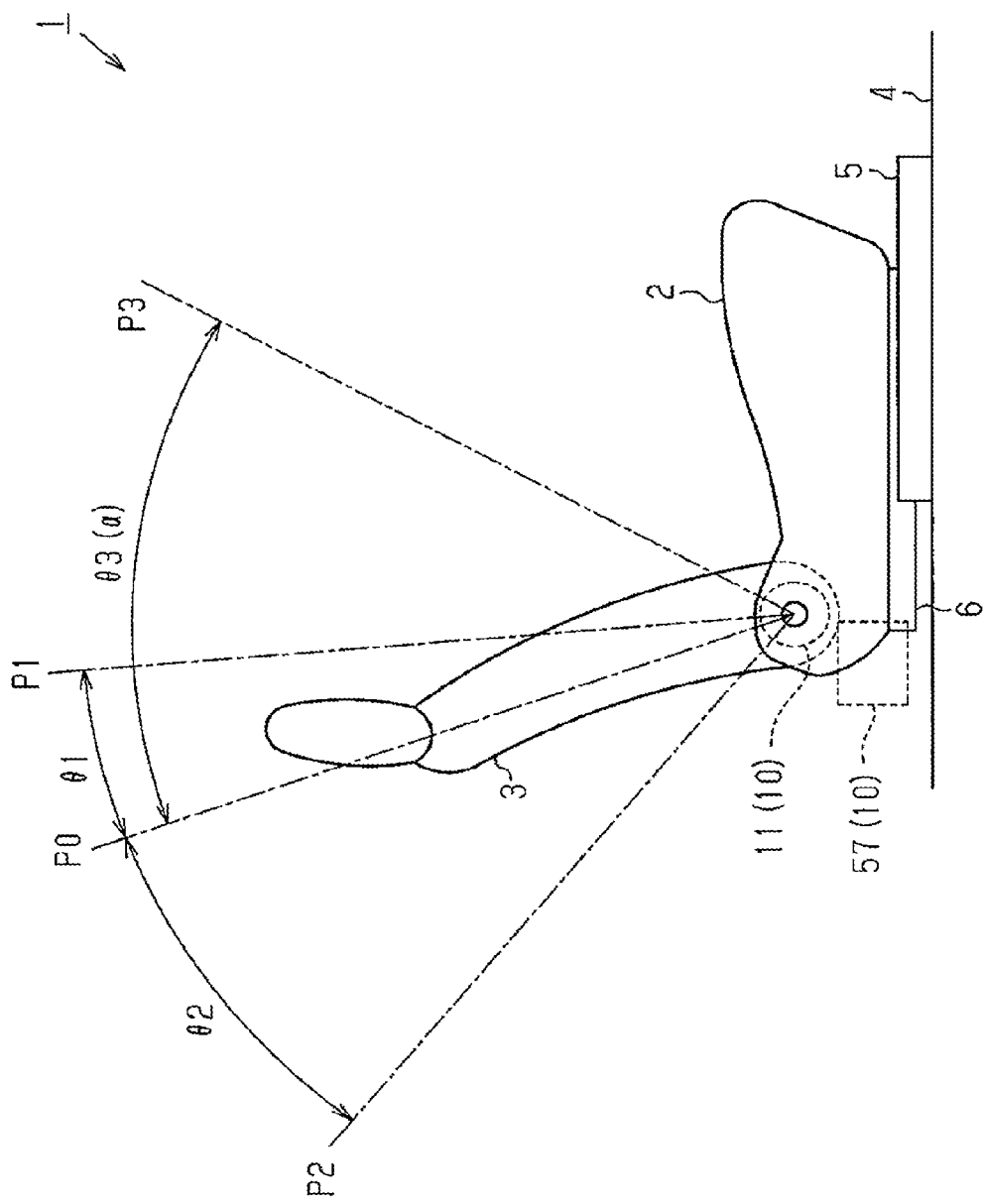
FIG. 1 is a side view of a vehicle seat in which a seat reclining device according to one embodiment is installed.

As shown in FIG. 1, a vehicle seat 1 includes a seat cushion 2 and a seat back 3 tiltably provided on the rear end of the seat cushion 2. In the present embodiment, right and left lower rails 5 and upper rails 6 are provided on a floor 4 of the vehicle. The upper rails 6 are moved on and relative to the lower rails 5 in the extending direction of the lower rails 5. The seat 1 is arranged on and supported by the upper rails 6, so that the position is adjustable in the front-rear direction of the vehicle. The seat 1 has a seat reclining device 10 that is capable of adjusting the tilt angle of the seat back 3.

As shown in FIGS. 2 to 6, a recliner 11 is arranged between the seat cushion 2 and the seat back 3. The recliner 11 restricts and allows rotation of the seat back 3 relative to the seat cushion 2. The occupant of the vehicle manipulates an operation handle 13 arranged on the side of the seat cushion 2 to adjust the tilt angle of the seat back 3 based on the function of the recliner 11.

Figure 2:
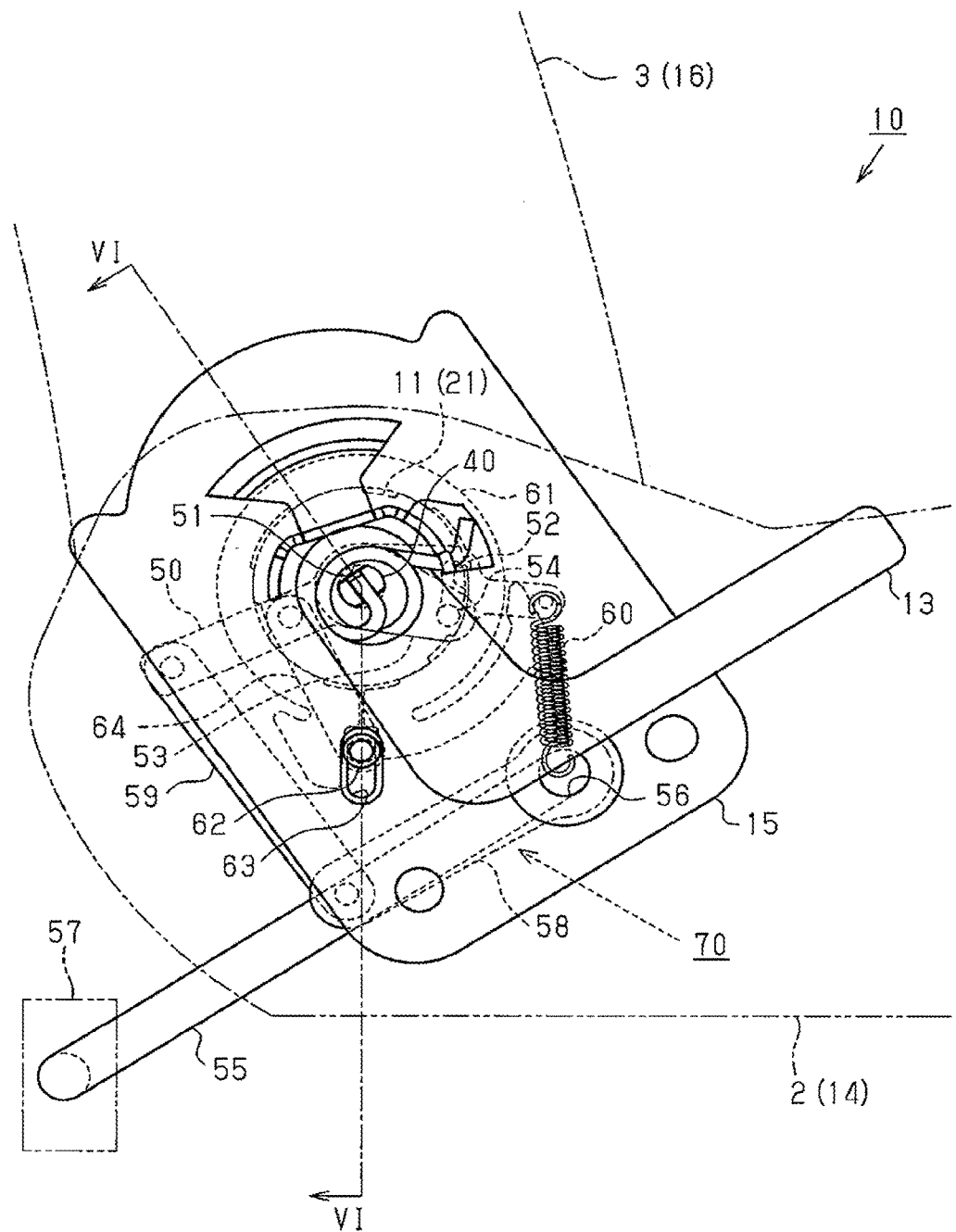
FIG. 2 is a side view of the seat reclining device shown in FIG. 1.
Figure 3:
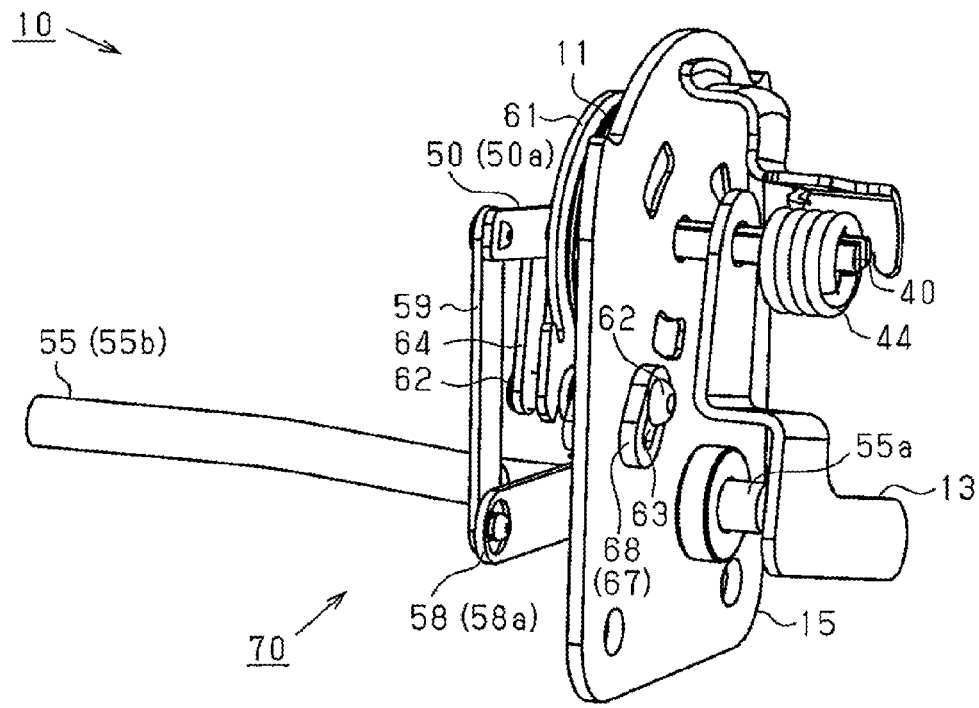
FIG. 3 is a perspective view of the seat reclining device shown in FIG. 2.

Specifically, the framework of the seat cushion 2 is constituted by a side frame 14. As shown in FIG. 2, the side frame 14 is provided on either side of the seat cushion 2. Each side frame 14 includes a plate-shaped member, which is a support plate 15 extending upward from the rear end. A seat back side member 16, which constitutes the framework of the seat back 3, is provided on either side of the seat back 3. Each seat back side member 16 is arranged on the inner side of and adjacent to the support plate 15 in the width direction of the seat 1. The recliner 11 is held between the upper end of the support plate 15 and the proximal end of the seat back side member 16, which are arranged to face each other in the width direction of the seat 1. The recliner 11 is arranged on the either side of seat back 3 in the width direction. In the following description, the recliner 11 on the right side of the seat 1 will be described.

Figure 6:
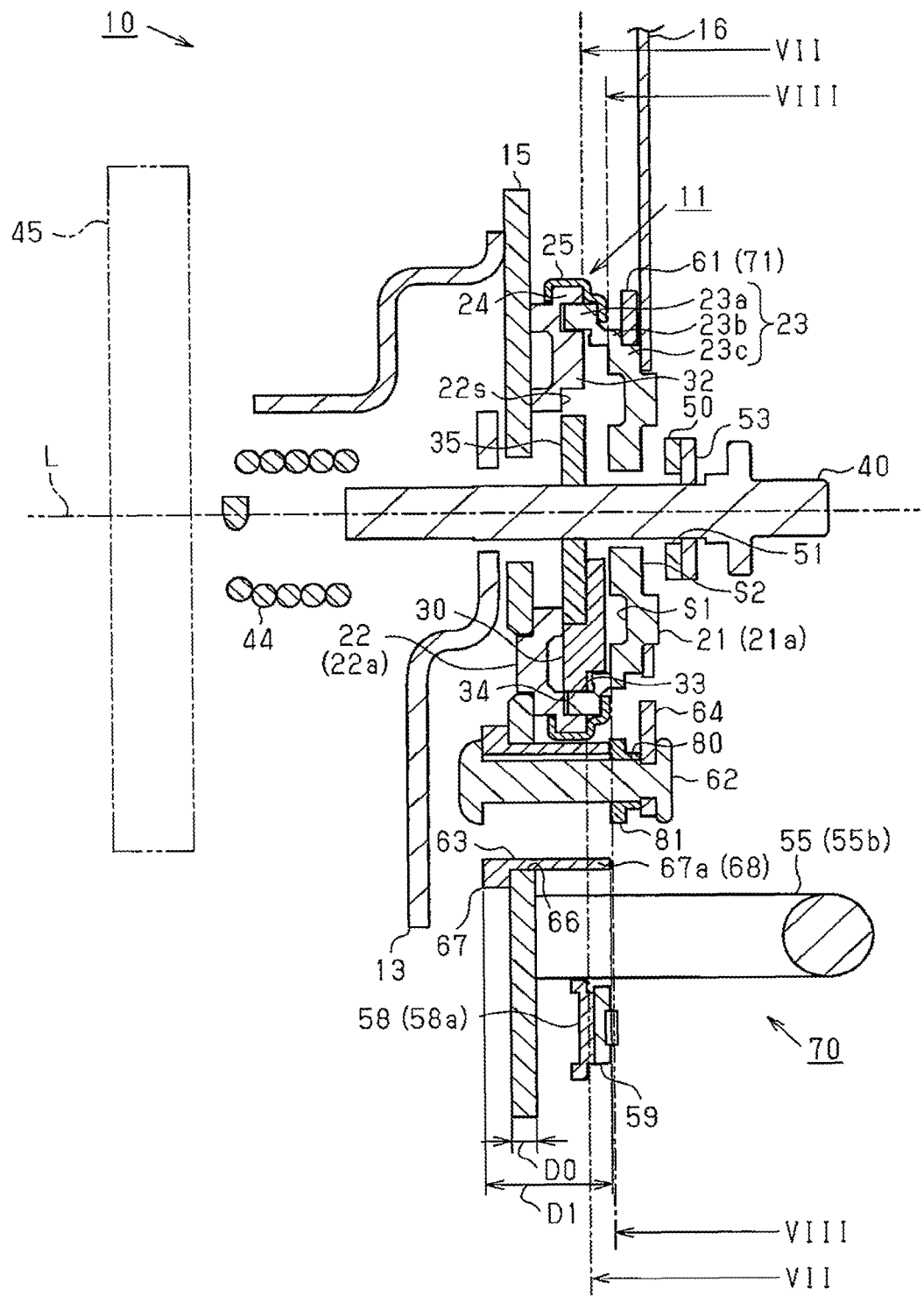
FIG. 6 is a cross-sectional view taken along line VI-VI of FIG. 2.
Figure 7:
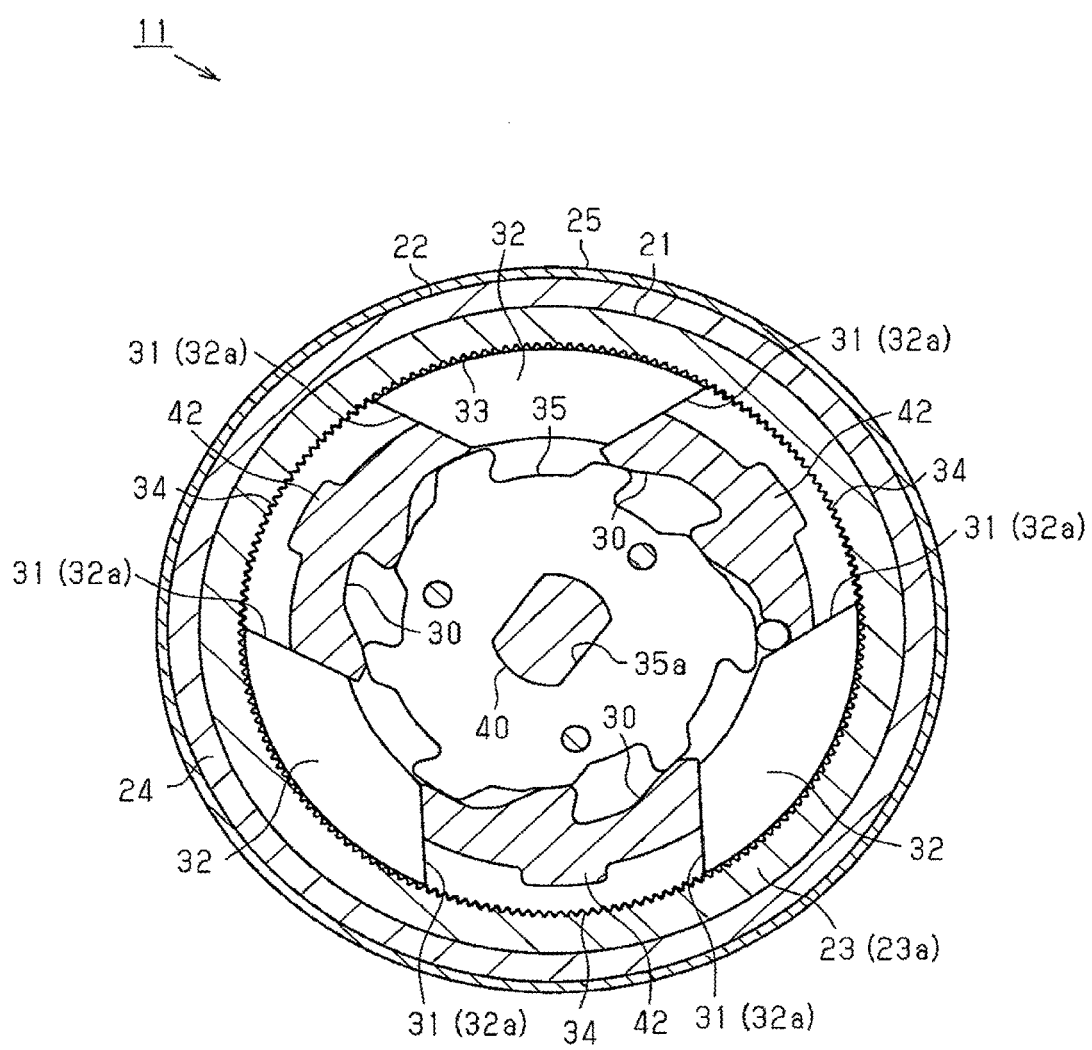
FIG. 7 is a cross-sectional view taken along line VII-VII of FIG. 6.
Figure 8:
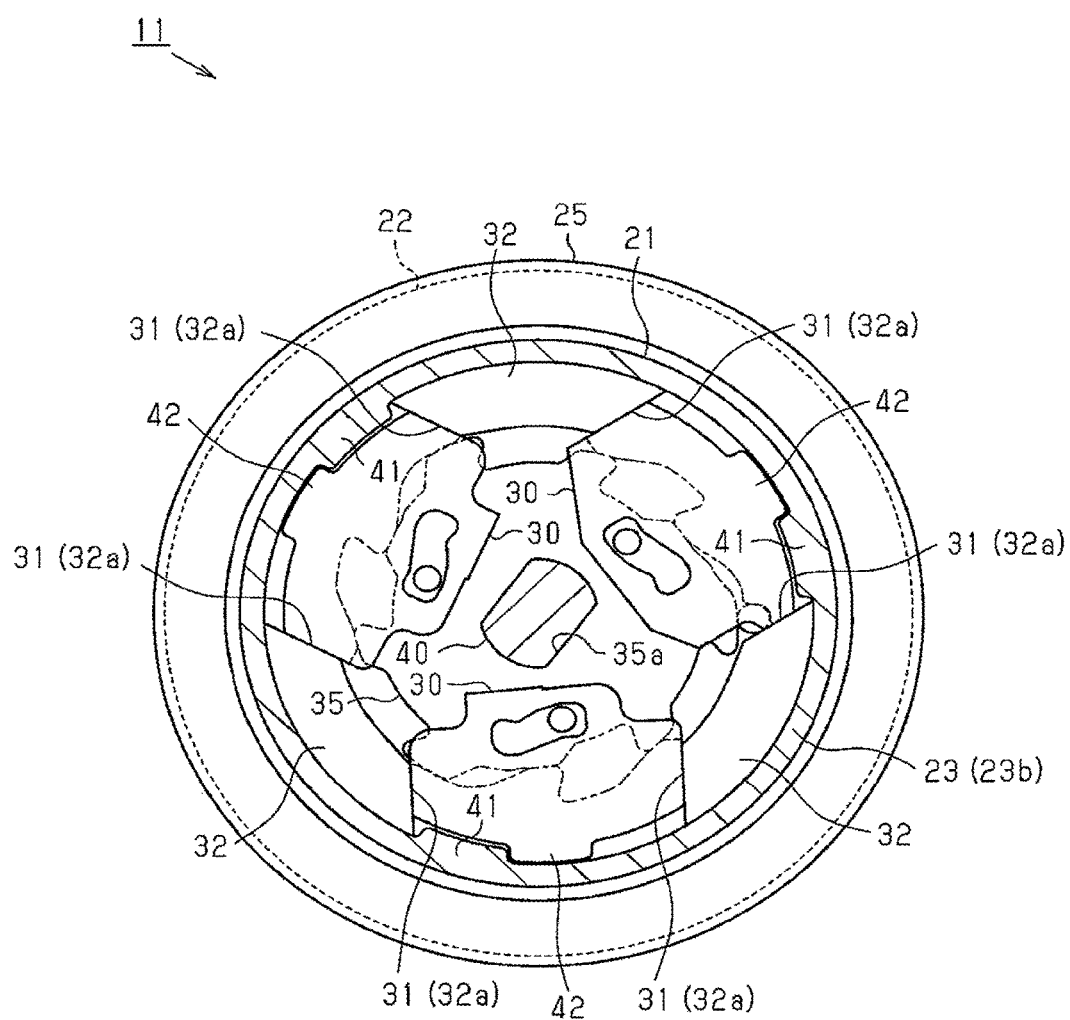
FIG. 8 is a cross-sectional view taken along line VIII-VIII of FIG. 6.

As shown in FIGS. 6 to 8, the recliner 11 includes a first rotating member (an upper bracket) 21 and a second rotating member (a lower bracket) 22. The first and second rotating members 21, 22 have a common rotation center (rotational axis L). That is, the first rotating member 21 is arranged coaxially with the second rotating member 22 and rotational relative to the second rotating member 22.

In the present embodiment, the first and second rotating members 21, 22 both have a substantially disk-like outer shape. The first and second rotating members 21, 22 have main bodies 21a, 22a, respectively. Annular circumferential wall portions 23, 24 are formed at peripheries of the first and second rotating members 21, 22, respectively. As shown in FIG. 6, the main bodies 21a, 22a are arranged to be opposed to each other. The circumferential wall portions 23, 24 extend toward each other from the main bodies 21a, 22a. The first and second rotating members 21, 22 are arranged coaxially and rotational relative to each other by fitting the circumferential wall portions 23, 24 to each other.

Specifically, the circumferential wall portion 23 of the first rotating member 21 is arranged radially inward of the circumferential wall portion 24 of the second rotating member 22. The circumferential wall portion 23 of the first rotating member 21 includes first and second circumferential wall portions 23a, 23b. The first and second circumferential wall portions 23a, 23b are not level with the circumferential wall portion 24. The first circumferential wall portion 23a is located radially outward of the second circumferential wall portion 23b. The outer diameter of the first circumferential wall portion 23a is set to be substantially equal to the inner diameter of the circumferential wall portion 24 of the second rotating member 22. This allows the first rotating member 21 to rotate relative to the second rotating member 22 with the first circumferential wall portion 23a sliding along the circumferential wall portion 24 of the second rotating member 22.

The recliner 11 of the present embodiment includes an annular holder 25. The annular holder 25 has a cross-sectional shape that can hold the first circumferential wall portion 23a of the first rotating member 21 and the circumferential wall portion 24 of the second rotating member 22 in the thickness direction (the lateral direction as viewed in FIG. 6). The annular holder 25 is fitted about the first and second rotating members 21, 22 to allow the first and second rotating members 21, 22 to rotate relative to each other, while restricting relative movement between the first and second rotating members 21, 22 along the rotational axis L.

As shown in FIG. 6, the first rotating member 21 is fixed to the seat back side member 16 (specifically, the proximal end of the seat back side member 16), and the second rotating member 22 is fixed to the support plate 15 (specifically, the upper end of the support plate 15). Locking members (pawls) 30, the number of which is three in the present embodiment, are arranged between the first and second rotating members 21 and 22. The locking members 30 function as engaging members that are engaged with the first and second rotating members 21, 22 to restrict relative rotation between the first and second rotating members 21 and 22.

Specifically, as shown in FIGS. 6 to 8, the second rotating member 22 has guide portions 31, which hold the locking members 30, such that the locking members 30 are allowed to move in the radial direction. The guide portions 31 are radially inward of the circumferential wall portion 24.

The locking members 30 are formed into plates. The second rotating member 22 has a facing surface 22s (the right surface as viewed in FIG. 6), which faces the first rotating member 21 along the direction of the rotational axis L. Three holding projections 32 are provided on the facing surface 22s. The holding projections 32 are arranged at substantially equal intervals in the circumferential direction. Each holding projection 32 has side wall portions 32a on the opposite sides in the circumferential direction and has a sectorial shape. The holding projections 32 are designed such that any two side wall portions 32a that face each other in the circumferential direction are substantially parallel with each other. Each locking member 30 is arranged between circumferentially adjacent holding projections 32.

Each locking member 30 is held between the side wall portions 32a of the holding projections 32 adjacent to each other in the circumferential direction, so that the side wall portions 32a of the holding projections 32 function as the guide portions 31. Each locking member 30 is movable in the radial direction while sliding on the side wall portions 32a of the holding projections 32 on the opposite sides in the circumferential direction of the locking member 30. Also, each locking member 30 is held by the second rotating member 22 to be movable in the radial direction while being restricted from moving in the circumferential direction by contact with the adjacent holding projections 32.

As shown in FIG. 7, the first rotating member 21 has inner teeth 33 formed on the circumferential wall portion 23 of the first rotating member 21, specifically, the first circumferential wall portion 23a. The inner teeth 33 are formed over the entire inner circumference. Further, each locking member 30 has outer teeth 34 formed on the distal end, which faces radially. The outer teeth 34 are configured to mesh with the inner teeth 33 on the inner circumference of the first circumferential wall portion 23a. When the outer teeth 34 on the locking members 30 mesh (engage) with the inner teeth 33 of the first rotating member 21, the second rotating member 22, which holds the locking members 30, and the first rotating member 21 are restricted from rotating relative to each other.

Specifically, the seat reclining device 10 of the present embodiment includes an operation shaft 40, to which the operation handle 13 is fixed, as shown in FIGS. 2 to 6. The operation shaft 40 rotates integrally with the operation handle 13.

As shown in FIGS. 6 to 8, the operation shaft 40 extends through the recliner 11 in the thickness direction. Specifically, the operation shaft 40 extends through the center of the main bodies 21a, 22a of the first and second rotating members 21, 22. The recliner 11 has a cam member 35, which is fixed to the operation shaft 40 to be non-rotational relative to the operation shaft 40. The operation shaft 40 has a pair of parallel flat sections. The cam member 35 has a fitting hole 35a with two parallel flat sections. The operation shaft 40 is inserted into the fitting hole 35a, so that the cam member 35 is fixed to the operation shaft 40 to be a non-rotational relative to the operation shaft 40.

The cam member 35 is arranged radially inward of the locking members 30 with the circumference contacting the proximal ends of the locking members 30. The recliner 11 is configured such that, when the locking members 30 are moved radially due to rotation of the cam member 35, the outer teeth 34 of the locking members 30 engage with or disengage from the inner teeth 33 of the first rotating member 21.

Specifically, when rotated counterclockwise relative to the second rotating member 22, which holds the locking members 30, as viewed in FIGS. 7 and 8, the cam member 35 moves the locking members 30 radially outward (in a spreading manner). The outer teeth 34 of the locking members 30 then mesh (engage) with the inner teeth 33 on the first rotating member 21. Accordingly, the recliner 11 restrains the first and second rotating members 21, 22 to be non-rotational relative to each other, thereby bringing about a locked state of the seat back 3, at which the tilt angle of the seat back 3 is fixed relative to the seat cushion 2.

When rotated clockwise as viewed in FIGS. 7 and 8, the cam member 35 moves (draws in) the locking members 30 radially inward. Accordingly, the outer teeth 34 of the locking members 30 disengage from the inner teeth 33 of the first rotating member 21. The recliner 11 thus allows the first and second rotating members 21, 22 to rotate relative to each other, thereby bringing about an unlocked state of the seat back 3, at which the tilt angle of the seat back 3 can be adjusted.

The operation shaft 40, which is rotates the cam member 35, is urged counterclockwise as viewed in FIGS. 7 and 8, or in the locking direction, by the force of a torsion coil spring 44 provided at one end of the operation shaft 40. When the operation handle 13 is pulled up, that is, rotated counterclockwise as viewed in FIG. 2, the operation shaft 40 is rotated clockwise as viewed in FIGS. 7 and 8, that is, in the unlocking direction. The force of the torsion coil spring rotates the operation shaft 40 in the locking direction when the operation handle 13 stops being pulled up.

As shown in FIG. 8, the second circumferential wall portion 23b of the first rotating member 21 has control projections 41 on the inner circumference at equal angular intervals in the circumferential direction. The number of the control projections 41 is three in the present embodiment. Each locking member 30 has an engaging projection 42, which projects radially outward toward the inner circumference of the second circumferential wall portion 23b. When contacting the engaging projections 42, the control projections 41 control locking and unlocking of the locking members 30.

Specifically, when unlocking the locking members 30, the recliner 11 moves the engaging projections 42 to positions radially inward of the control projections 41 of the second circumferential wall portion 23b. Thus, when the recliner 11 is in the unlocked state, the engaging projections 42 of the locking members 30 do not contact the control projections 41 of the second circumferential wall portion 23b, and the first and second rotating members 21, 22 are allowed to rotate relative to each other.

In the present embodiment, when the positions of the control projections 41 and the engaging projections 42 overlap with each other in the circumferential direction due to relative rotation of the first and second rotating members 21, 22, the control projections 41 and the engaging projections 42 slide on each other to restrict the locking members 30 from moving radially outward, so that the locking members 30 are restricted from being locked. That is, the recliner 11 of the present embodiment is capable of locking the locking members 30 in a predetermined rotational angle range in which the control projections 41 of the second circumferential wall portion 23b and the engaging projections 42 of the locking members 30 do not overlap in the circumferential direction. In other words, the recliner 11 is capable of fixing the relative rotation positions of the first and second rotating members 21, 22. In the rotational angle range in which the control projections 41 and the engaging projections 42 slide on each other, the locking members 30 of the recliner 11 are maintained in the unlocked state.

As shown in FIG. 1, the seat reclining device 10 of the present embodiment is capable of changing and fixing the tilt angle of the seat back 3 using the function of the recliner 11 within a range between a tilt angle θ1, which is inclined forward from a predetermined basic position P0, and a tilt angle θ2, which is inclined rearward from the basic position P0. That is, the seat reclining device 10 is capable of adjusting the tilt angle within the above described angle range.

The adjustment limit of the forward tilting is an upright position P1. The seat 1 of the present embodiment is capable of tilting the seat back 3 beyond the upright position P1 to a position that is tilted forward from the basic position P0 by a tilt angle θ3 (a maximum forward tilt position P3). In the present embodiment, stoppers (not shown) define the maximum forward tilt position P3 (the tilt angle θ3) and a maximum rearward tilt position P2 (the tilt angle θ2) of the seat back 3. In the front tilt angle range beyond the upright position P1, the seat 1 is configures such that the recliner 11 is maintained without continuing to pulling up the operation handle 13, that is, the tilt angle of the seat back 3 is not fixed.

Walk-in Function and Memory Function

Next, a walk-in function and memory function implemented in the seat reclining device 10 of the present invention will be described.

As shown in FIGS. 2 to 5, the seat reclining device 10 has a walk-in lever 50, which is capable of rotating the operation shaft 40 in the unlocking direction (the clockwise direction as viewed in FIG. 2), independently of the operation handle 13. Also, as shown in FIG. 6, the seat 1 has an urging member 45 (for example, a spiral spring) that urges the seat back 3 forward. Accordingly, the recliner 11, which is arranged between the operation handle 13 and the seat cushion 2, is allowed to be unlocked without pulling up the operation handle 13, so that the seat back 3 can be tilted to the maximum forward tilt position P3. That is, the seat reclining device 10 is provided with a walk-in function.

Specifically, as shown in FIGS. 2 to 5, and 9A to 9C, the walk-in lever 50 has an insertion hole 51 that has a slightly larger diameter than that of the operation shaft 40. The walk-in lever 50 is supported by the operation shaft 40 to be rotational about the operation shaft 40 inserted in the insertion hole 51.

The walk-in lever 50 has an elongated hole 52 that extends arcuately along the direction of rotational movement of the walk-in lever 50. Further, a connection lever 53 is provided on the side of the walk-in lever 50. The connection lever 53 is fixed to the operation shaft 40 such that relative rotation is inhibited. The connection lever 53 also has a coupling pin 54, which is inserted in the elongated hole 52 of the walk-in lever 50.

Figure 9A:
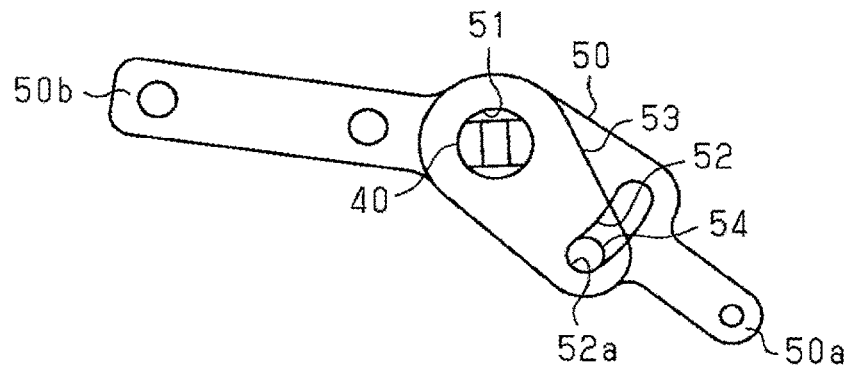
FIG. 9A is a diagram showing an operation shaft, a walk-in lever, and a connection lever at initial positions when the recliner is in a locked state.
Figure 9B:
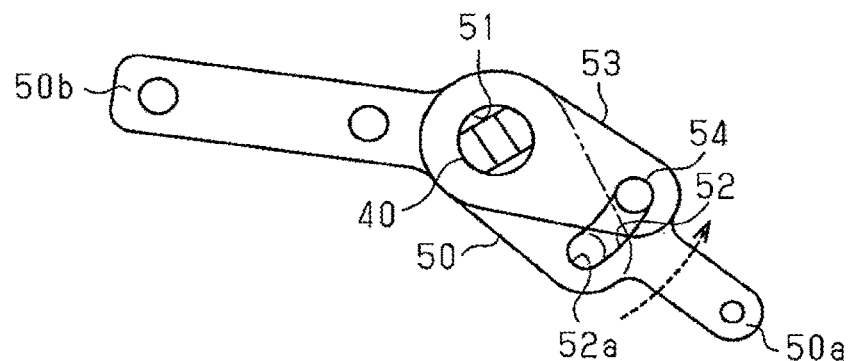
FIG. 9B is an explanatory diagram showing a motion of the operation shaft, the walk-in lever, and the connection lever when a reclining operation is performed through the operation handle.

In the present embodiment, the relative rotation positions of the walk-in lever 50 and the connection lever 53 are set such that, when the recliner 11 is in the locked state, the coupling pin 54 inserted in the elongated hole 52, is located at an end 52a on the leading side in the locking direction (the clockwise direction as viewed in FIG. 9A), within the elongated hole 52 as shown in FIG. 9A.

Accordingly, when the operation shaft 40 is moved in the unlocking direction (the counterclockwise direction as viewed in FIG. 9B) due to the operation handle 13 being pulled up, the coupling pin 54 inserted in the elongated hole 52 of the walk-in lever 50 is moved in the longitudinal direction of the elongated hole 52. The connection lever 53 therefore does not contact the walk-in lever 50. That is, the operation shaft 40 can be rotated in the unlocking direction without rotating the walk-in lever 50.

Figure 9C:
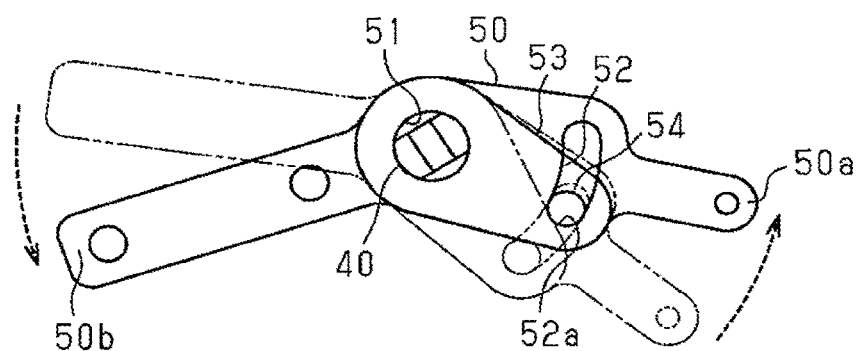
FIG. 9C is an explanatory diagram showing a motion of the operation shaft, the walk-in lever, and the connection lever when a walk-in operation is performed through the foot lever.

In contrast, when the walk-in lever 50 is rotated in the unlocking direction (the counterclockwise direction as viewed in FIG. 9C), the end 52a of the elongated hole 52 is engaged with the coupling pin 54 inserted in the elongated hole 52 as shown in FIG. 9C. This causes the connection lever 53 and the operation shaft 40 to rotate in the unlocking direction integrally with the walk-in lever 50.

As shown in FIGS. 2 to 5, the seat reclining device 10 includes a walk-in operation shaft 55, which is bent to have a crank shape.

One end of the walk-in operation shaft 55 (a first shaft portion 55a) is inserted in and rotationally supported by a support hole 56 in the support plate 15. The other end of the walk-in operation shaft 55 (a second shaft portion 55b) is fixed to a foot lever 57 (see FIG. 1), which can be stepped on from behind the seat 1. Further, the first shaft portion 55a, which is inserted in the support hole 56 of the support plate 15, is fixed to a coupling lever 58, which rotates integrally with the walk-in operation shaft 55. The seat reclining device 10 also includes a link member 59, which couples the coupling lever 58 and the walk-in lever 50 to each other.

Figure 4:
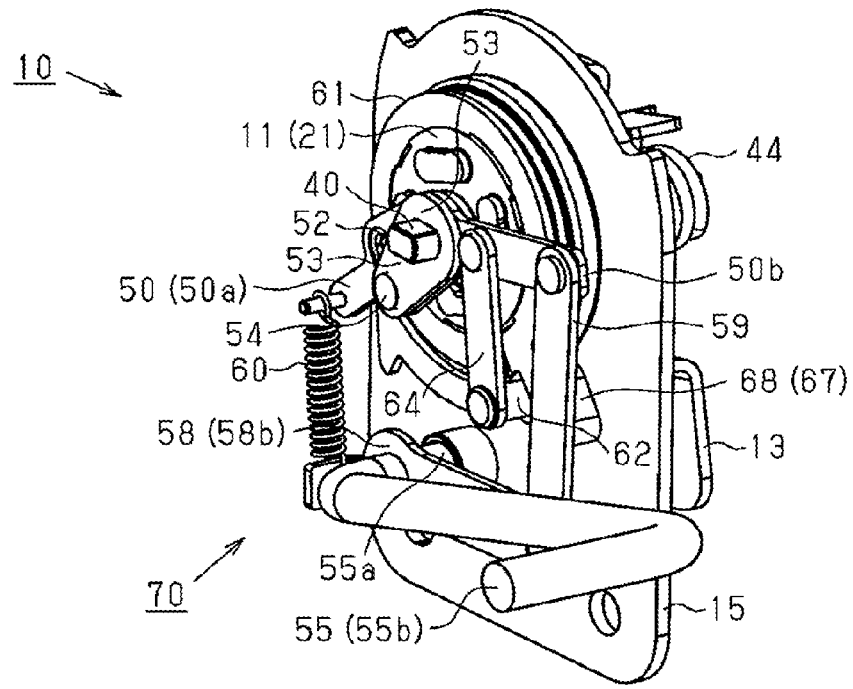
FIG. 4 is a perspective view of the seat reclining device shown in FIG. 2.
Figure 5:
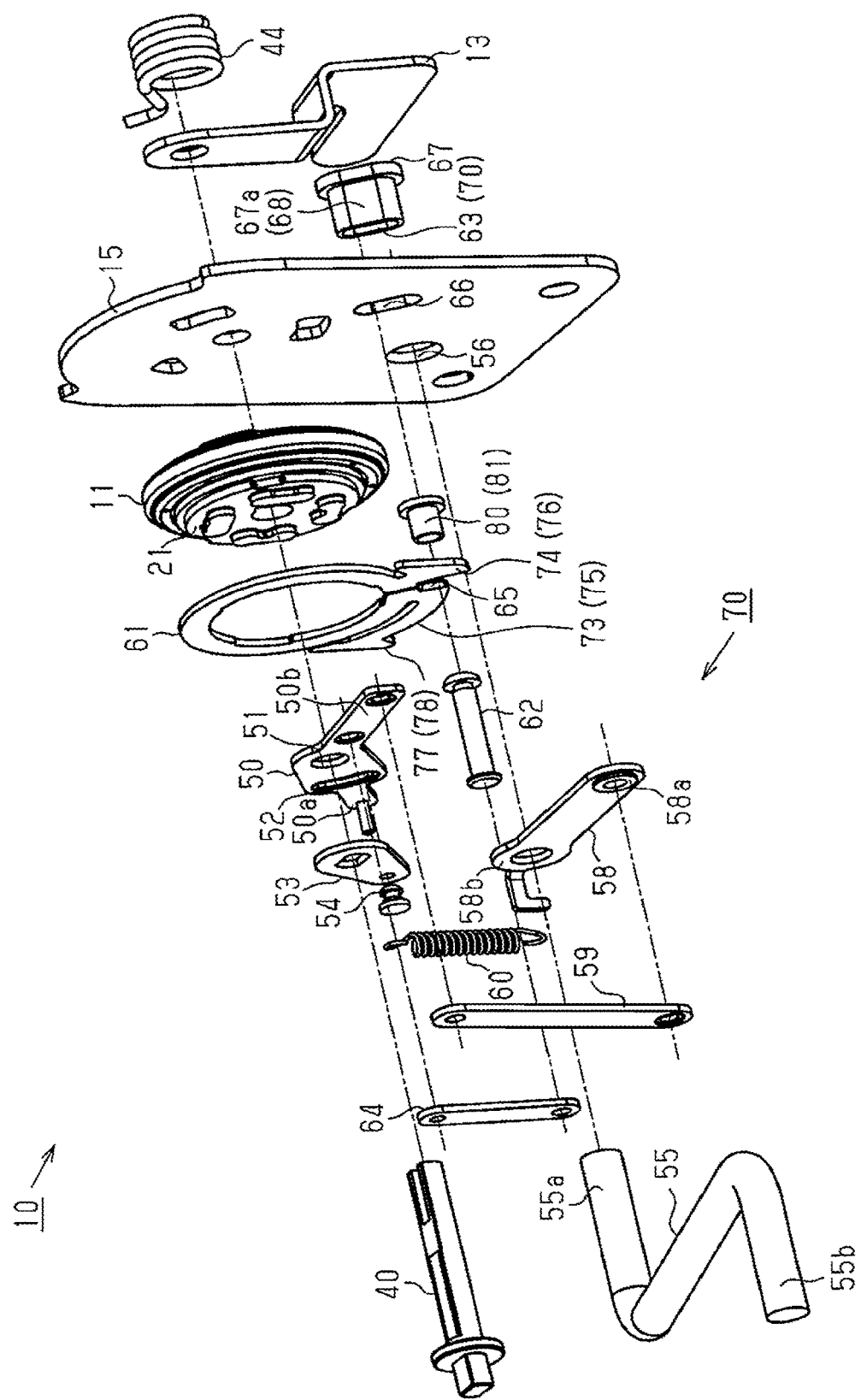
FIG. 5 is an exploded perspective view of the seat reclining device shown in FIG. 4.
Figure 10:
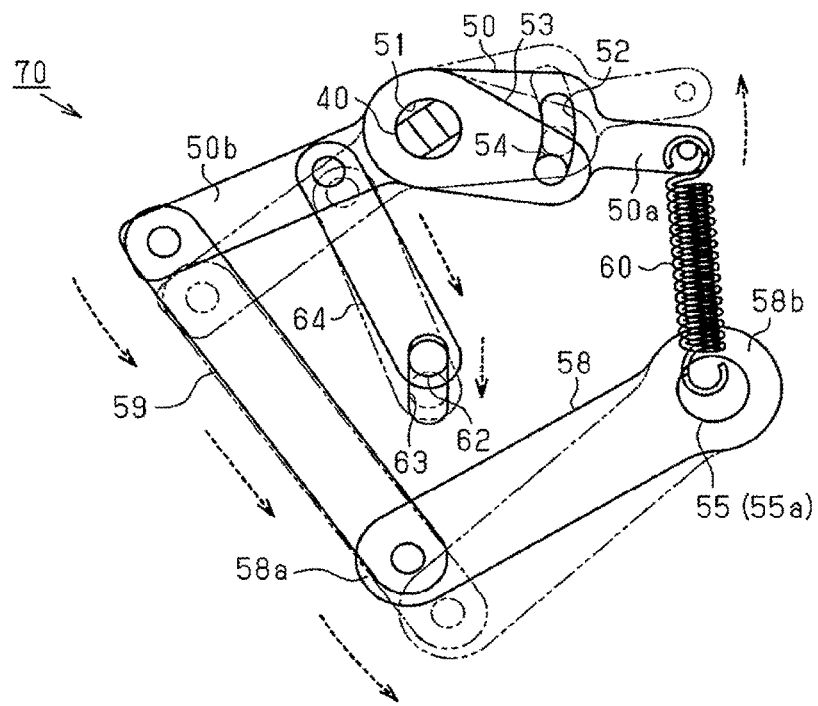
FIG. 10 is an explanatory diagram showing an action of an operation mechanism.

Specifically, as shown in FIGS. 4, 5, and 10, one end of the link member 59 is rotationally coupled to a distal end 58a of the coupling lever 58. The walk-in lever 50 has a first extension 50a, in which the elongated hole 52 is provided, and a second extension 50b, which is located on the opposite side of the insertion hole 51 serving as a rotation center from the first extension 50a. The other end of the link member 59 is rotationally coupled to one end of the walk-in lever 50, specifically, to the end of the second extension 50b.

When the foot lever 57 is stepped on, the coupling lever 58 is rotated in the counterclockwise direction as viewed in FIG. 10 integrally with the walk-in operation shaft 55 (more specifically, the first shaft portion 55a), which is pivotally supported by the support plate 15. Thus, the walk-in lever 50 is rotated in the unlocking direction by being pulled down by the link member 59, which is located between the walk-in lever 50 and the coupling lever 58 in FIG. 10.

The seat reclining device 10 of the present embodiment a coil spring 60, the ends of which are engaged with the first extension 50a of the walk-in lever 50 and a proximal end 58b of the coupling lever 58. The walk-in lever 50 is urged in the locking direction (the clockwise direction as viewed in FIG. 10) by the force of the coil spring 60. Accordingly, when the foot lever 57 is released, the walk-in lever 50, the connection lever 53, and the operation shaft 40 return to the initial positions, which correspond to the locked state of the recliner 11.

Also, as shown in FIGS. 2 to 5, and 11, the seat reclining device 10 includes a first memory member 61 and a second memory member 62. The first memory member 61 engages with the outer surface of the first rotating member 21 through friction. The second memory member 62 is configured to engage with and disengage from the first memory member 61.

In the seat reclining device 10, the first memory member 61 is fitted to the circumferential wall portion 23 of the first rotating member 21 as shown in FIG. 6. The first memory member 61 is coaxial and integrally rotational with the first rotating member 21 based on the frictional engagement force with the circumferential wall portions 23 (hereinafter, simply referred to as the frictional engagement force). The first memory member 61 is also rotational relative to the first rotating member 21 against the frictional engagement force.

Specifically, the first and second rotating members 21, 22 are formed through plastic deformation (pressing) of metal plates, so that the main body 21a, 22a are integrally formed with the circumferential wall portions 23, 24, respectively.

For example, when the first circumferential wall portion 23a of the first rotating member 21 is formed, a step is formed through plastic deformation in which an inner surface S1 of the first rotating member 21 is pushed toward an outer surface S2 (from the left side toward the right side as viewed in FIG. 6), and the step is formed as the outer periphery of the second circumferential wall portion 23b. Further, when the second circumferential wall portion 23b, which has the control projections 41 on the inner circumference, is formed, a step is formed through plastic deformation in which the inner surface S1 of the first rotating member 21 is pushed toward the outer surface S2, and the formed step is a third circumferential wall portion 23c. The first memory member 61 is fitted to the outer circumferential surface of the third circumferential wall portion 23c.

Figure 11:
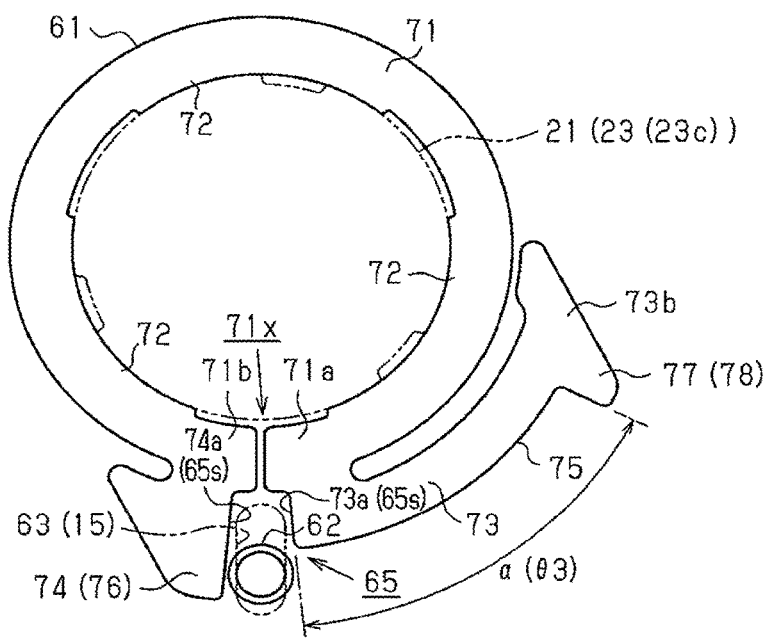
FIG. 11 is a side view of the first memory member and the second memory member shown in FIG. 4.

In contrast, as shown in FIGS. 5 and 6, the second memory member 62 is shaped as a shaft. The support plate 15, to which the second rotating member 22 is fixed, has a guide hole 63 for receiving the second memory member 62. The guide hole 63 has a shape elongated in the radial direction of the recliner 11 (the vertical direction as viewed in FIGS. 2 and 6). The second memory member 62 is supported by the guide hole 63 to be movable in the longitudinal direction of the guide hole 63. As shown in FIG. 11, the first memory member 61 has an engagement slot 65. The second memory member 62, which moves in the guide hole 63, can engage with and disengage from the engagement slot 65.

In the present embodiment, the guide hole 63 is formed by fitting a tubular member 67 to a through-hole 66 formed in the support plate 15 as shown in FIGS. 2 to 6. The tubular member 67 has an axial length D1 that is greater than the thickness D0 of the support plate 15. In the present embodiment, a peripheral wall 67a of the tubular member 67 functions as a support wall 68, which protrudes in the thickness direction of the support plate 15 in the periphery of the guide hole 63.

Also, as shown in FIGS. 2 to 5 and 10, the seat reclining device 10 includes a link member 64, which couples the second memory member 62 and the walk-in lever 50 to each other. Specifically, as in the case of the link member 59, one end of which is connected to the coupling lever 58, one end of the link member 64 is connected to the second extension 50b of the walk-in lever 50. This interlocks the walk-in lever 50 and the second memory member 62 to each other.

Figure 12:
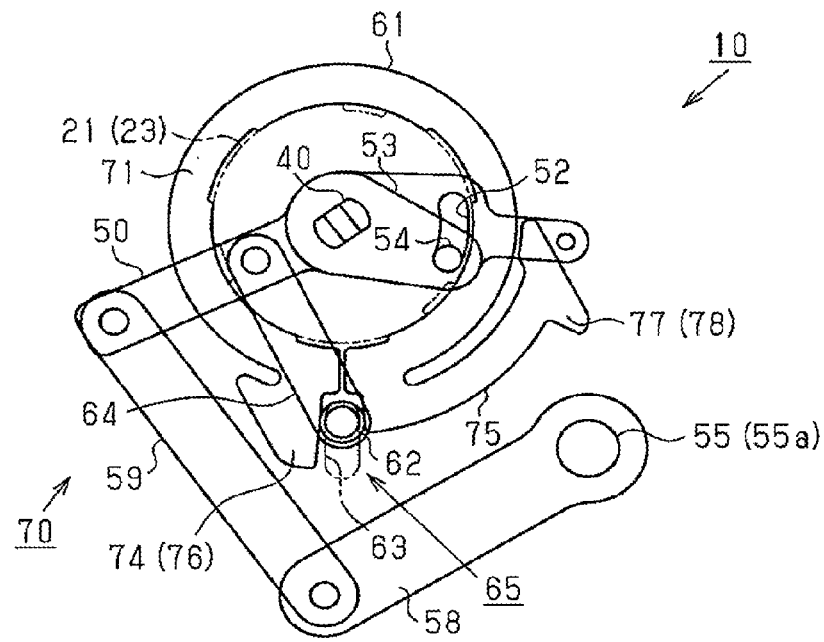
FIG. 12 is an explanatory diagram showing an action of the seat reclining device when the first and second memory members are in an engaged state at a first relative rotation position.
Figure 13:
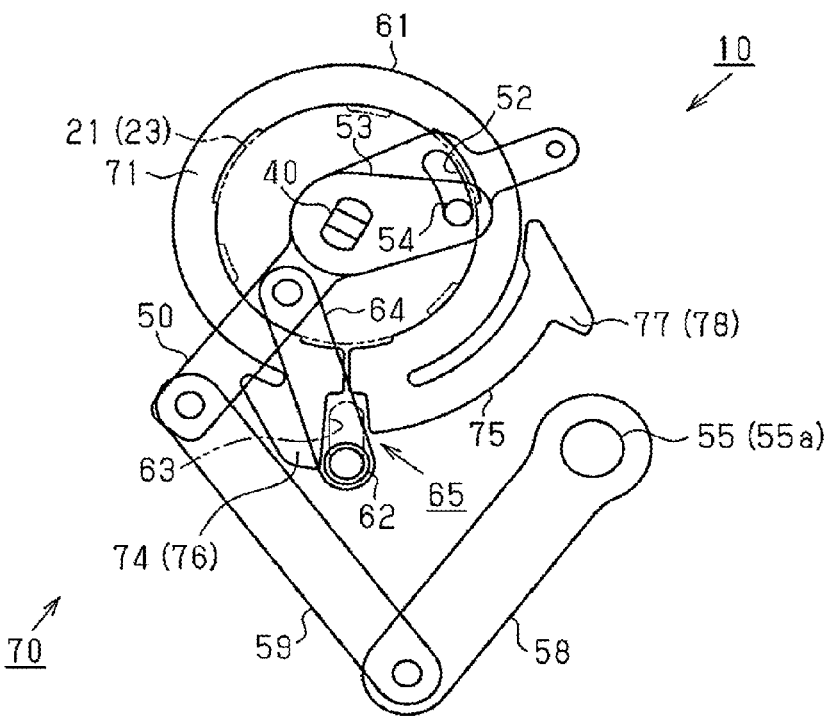
FIG. 13 is an explanatory diagram showing an action of the seat reclining device when the first and second memory members are in a disengaged state at the first relative rotation position.

As shown in FIGS. 10, 12, and 13, the link member 64 is configured such that, when the walk-in lever 50 is rotated in the unlocking direction (the counterclockwise direction as viewed in the drawings), the second memory member 62 in the guide hole 63 is moved radially outward in the recliner 11, that is, in a direction away from the first memory member 61 (the downward direction in the drawings). That is, the seat reclining device 10 includes an operation mechanism 70 in which the second memory member 62 is either engaged with or disengaged from the first memory member 61. In conjunction with engaging/disengaging action of the second memory member 62, the operation mechanism 70 selectively locks and unlocks the locking members 30.

More specifically, as shown in FIG. 11, the first memory member 61 includes a frictional engagement portion 71, which has an annular shape with a discontinuous section (a cut 71x), or a C-ring shape. The frictional engagement portion 71 has sliding projections 72 on the inner circumference. The first memory member 61 causes the frictional engagement portion 71 to be fitted to the circumferential wall portion 23 (23c) of the first rotating member 21 with the sliding projections 72 sliding on the circumferential wall portion 23 (23c), thereby generating adequate frictional engagement force between the frictional engagement portion 71 and the first rotating member 21.

The first memory member 61 has an arcuate extension 73, which projects radially outward from the frictional engagement portion 71. The arcuate extension 73 has a circumferential end 73a in the vicinity of a cut 71x. The first memory member 61 further includes a first projection 74, which projects radially outward from the frictional engagement portion 71 is located on the opposite side of the cut 71x from the circumferential end 73a.

In the first memory member 61, a side surface 74a of the first projection 74 and the circumferential end 73a of the arcuate extension 73 are provided as two side wall surfaces 65s that are opposed to each other in the circumferential direction. That is, the engagement slot 65 is defined by the side wall surfaces 65s on the first end 71a and the second end 71b, which are opposed to each other with the cut 71x in between. When the second memory member 62 enters and engages with the engagement slot 65 of the first memory member 61, the first memory member 61 is restricted from rotating relative to the second rotating member 22.

Specifically, as shown in FIG. 12, when the foot lever 57 is not stepped on, the second memory member 62 is arranged in the guide hole 63 of the support plate 15 and at a radially inner position (on the upper side as viewed in FIG. 12) in the first memory member 61. That is, the second memory member 62 is in the engagement slot 65. This causes the second memory member 62 to engage with the first memory member 61, so that the first memory member 61 is restricted from rotating relative to the second rotating member 22, which is fixed to the support plate 15.

That is, if the operation handle 13 (see FIG. 2) is pulled up, the walk-in lever 50 is not rotated and the engagement of the second memory member 62 with the first memory member 61 is maintained. However, since pulling up the operation handle 13 unlocks the locking members 30, the first rotating member 21 is allowed to rotate relative to the second rotating member 22 against the frictional engagement force. Accordingly, the seat reclining device 10 allows the tilt angle of the seat back 3 to be adjusted through the normal reclining operation using the operation handle 13.

In contrast, as shown in FIG. 13, when the foot lever 57 (see FIGS. 1 and 2) is manipulated, the walk-in lever 50 is rotated in the unlocking direction. Thus, the second memory member 62 is moved in the guide hole 63 of the support plate 15 in the radially outward direction of the first memory member 61 (downward as viewed in FIG. 13). This causes the second memory member 62 to exit the engagement slot 65, so that the second memory member 62 and the first memory member 61 are disengaged from each other. The first memory member 61 is therefore allowed to rotate relative to the second rotating member 22.

At this time, in the recliner 11, rotation of the walk-in lever 50 of the operation mechanism 70 unlocks the locking members 30 (disengagement), so that the first and second rotating members 21, 22 are allowed to rotate relative to each other. Accordingly, the first rotating member 21 and the first memory member 61 are allowed to rotate integrally due to the frictional engagement force.

Figure 14:
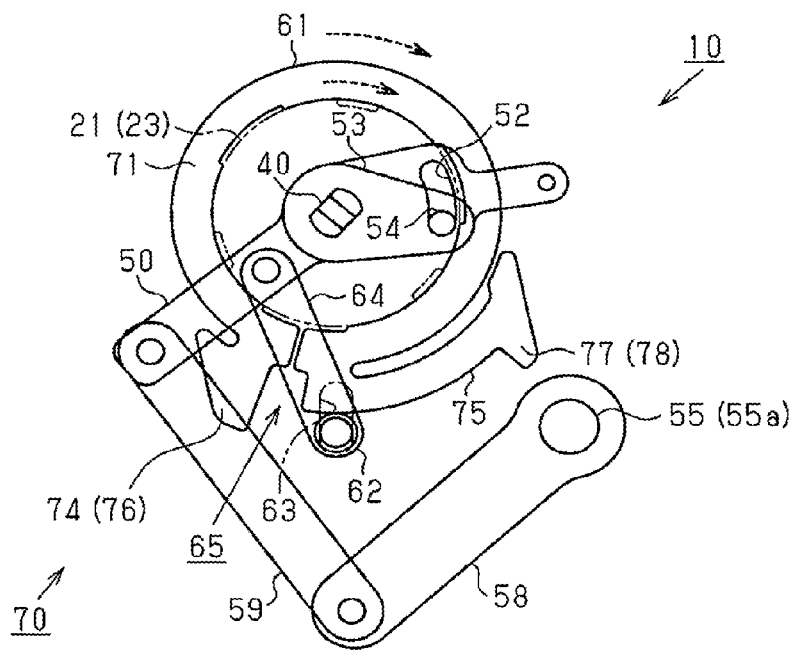
FIG. 14 is an explanatory diagram showing an action of the seat reclining device at the forward folding operation.
Figure 15:
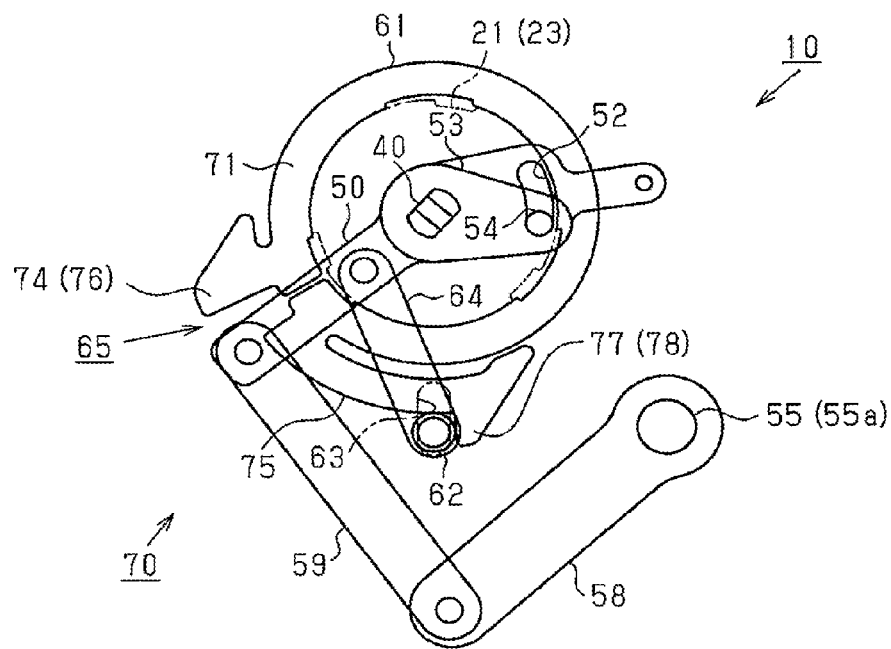
FIG. 15 is an explanatory diagram showing an action of the seat reclining device when the first and second memory members are in a contacting state at a second relative rotation position.

As shown in FIGS. 11, 14, and 15, the arcuate extension 73 of the first memory member 61 has a sliding surface 75 on the outer periphery. When the first memory member 61 is rotated integrally with the first rotating member 21 as the seat back 3 is tilted, the second memory member 62, which has disengaged from the engagement slot 65, slides on the sliding surface 75 after exiting the engagement slot 65. The seat reclining device 10 is thus capable of tilting the seat back 3 to the maximum forward tilt position P3 without continuing manipulation of the foot lever.

That is, the seat back 3, which is urged by the urging member 45 (see FIG. 6), is tilted forward by the force of the urging member 45 when the recliner 11, which is arranged between the seat back 3 and the seat cushion 2, is unlocked. At this time, the first memory member 61 rotates integrally with the first rotating member 21, so that the second memory member 62 slides on the sliding surface 75. This restricts engaging action of the second memory member 62 toward the radially inner side of the first memory member 61, so that rotation of the walk-in lever 50 in the clockwise direction in FIGS. 14 and 15, that is, the locking action of the locking members 30 is restricted. This maintains the unlocked state of the recliner 11, so that the seat back 3, which is urged by the urging member 45, reaches the maximum forward tilt position P3.

When the seat back 3, which has been folded forward by the walk-in function, is raised, the recliner 11 is maintained unlocked as long as the second memory member 62 is sliding on the sliding surface 75 of the first memory member 61.

That is, when the seat back 3 is raised, the first rotating member 21 and the first memory member 61 are rotated integrally due to the frictional engagement force, so that the second memory member 62 is moved along the sliding surface 75 of the first memory member 61 in the circumferential direction to the position where the second memory member 62 can enter the engagement slot 65. This allows the seat back 3 to return to the tilt position at which the seat back 3 was located before the forward folding operation. That is, the seat reclining device 10 is provided with a memory function.

More specifically, as shown in FIG. 11, the first projection 74 of the first memory member 61 projects further radially outward than the sliding surface 75 at the outer periphery of the arcuate extension 73, which forms the two side wall surfaces 65s of the engagement slot 65 together with the first projection 74.

As shown in FIGS. 6 and 13, when the seat back 3 is tilted rearward with the first and second rotating members 21, 22 rotating relative to each other, the first memory member 61 rotates integrally with the first rotating member 21. Accordingly, the first projection 74 contacts the second memory member 62 in the vicinity of the second rotating member 22 (or the support plate 15). Specifically, the first projection 74 is configured to contact the second memory member 62 at a first relative rotation position Q1, at which the second memory member 62 can enter the engagement slot 65. In the present embodiment, the first projection 74 functions as a first stopper portion 76 to restrict integral rotation of the first memory member 61 and the first rotating member 21 due to the frictional engagement force.

Also, as shown in FIG. 11, the arcuate extension 73 of the first memory member 61 has a second projection 77 in the vicinity of a circumferential end 73b that is on the opposite side to the engagement slot 65. Like the first projection 74, the second projection 77 extends further radially outward than the sliding surface 75.

As shown in FIGS. 6 and 15, when the seat back 3 is tilted forward with the first and second rotating members 21, 22 rotating relative to each other, the first memory member 61 rotates integrally with the first rotating member 21. Accordingly, the second projection 77 contacts the second memory member 62 in the vicinity of the second rotating member 22. Apparently, the second projection 77 is configured to contact the second memory member 62 at a second relative rotation position Q2, where the second memory member 62, which moves on the sliding surface 75 in the circumferential direction, reaches the end of the sliding surface 75. In the present embodiment, the second projection 77 functions as a second stopper portion 78 to restrict integral rotation of the first memory member 61 and the first rotating member 21 due to the frictional engagement force.

In the present embodiment, the frictional engagement force of the first memory member 61 acting on the first rotating member 21 (specifically, the circumferential wall portion 23) is set such that, even after the second memory member 62 contacts the second projection 77, which forms the second stopper portion 78, the seat back 3 can reach the maximum forward tilt position P3 due to the force of the urging member 45. As shown in FIGS. 1 and 11, a relative rotation angle α between the first relative rotation position Q1 and the second relative rotation position Q2, which are set on the first memory member 61, is set to be equal to the tilt angle θ3 from the basic position P0 to the maximum forward tilt position P3 set for the seat back 3.

Figure 16:
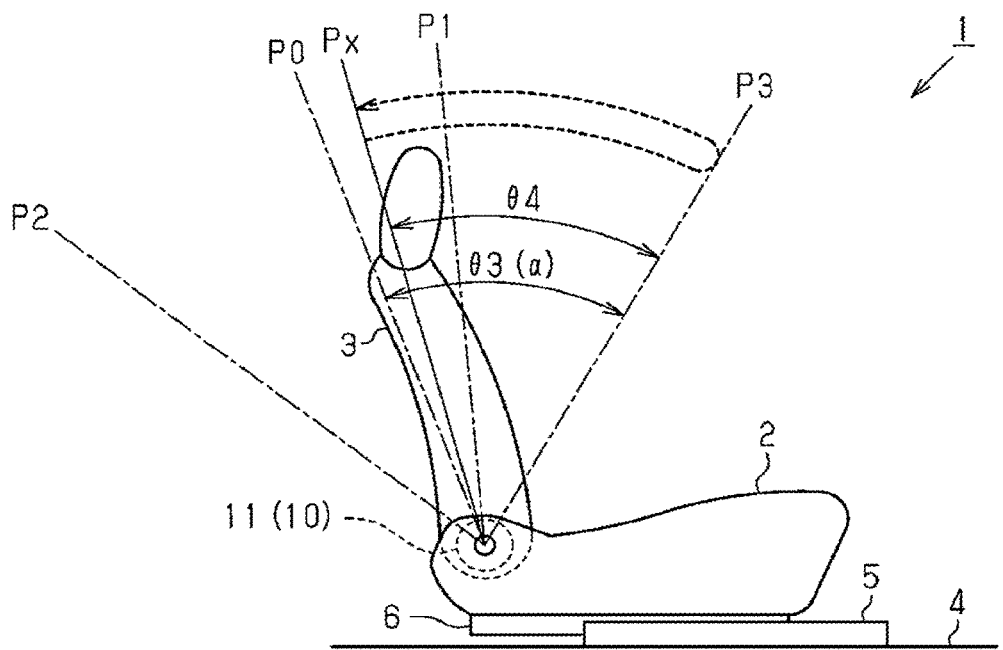
FIG. 16 is an explanatory diagram showing operation of the seat reclining device at the walk-in access enabling action in which the seat is inclined forward.

That is, if the tilt position Px of the seat back 3 before the forward folding operation is between the basic position P0 and the upright position P1 as shown in FIG. 16, the tilt angle θ4 by which the seat back 3 reaches the maximum forward tilt position P3 through the forward folding operation is smaller than the tilt angle θ3 from the basic position P0 to the maximum forward tilt position P3 (θ4<θ3). The tilt angle θ4 is smaller than the relative rotation angle α between the first relative rotation position Q1 and the second relative rotation position Q2, which are set on the first memory member 61.

Thus, when the forward folding operation is started when the seat 1 is at a forward tilt state, the second memory member 62, which slides on the sliding surface 75, does not reach the end, which contact the second projection 77. This maintains the relative rotation position of the first memory member 61, which is frictionally engaged with the first rotating member 21. Therefore, the seat reclining device 10 is configured such that, when the seat back 3 is raised rearward after being folded forward, the seat back 3 returns to the tilt position Px, at which the seat back 3 was located before the forward folding operation.

Figure 17:
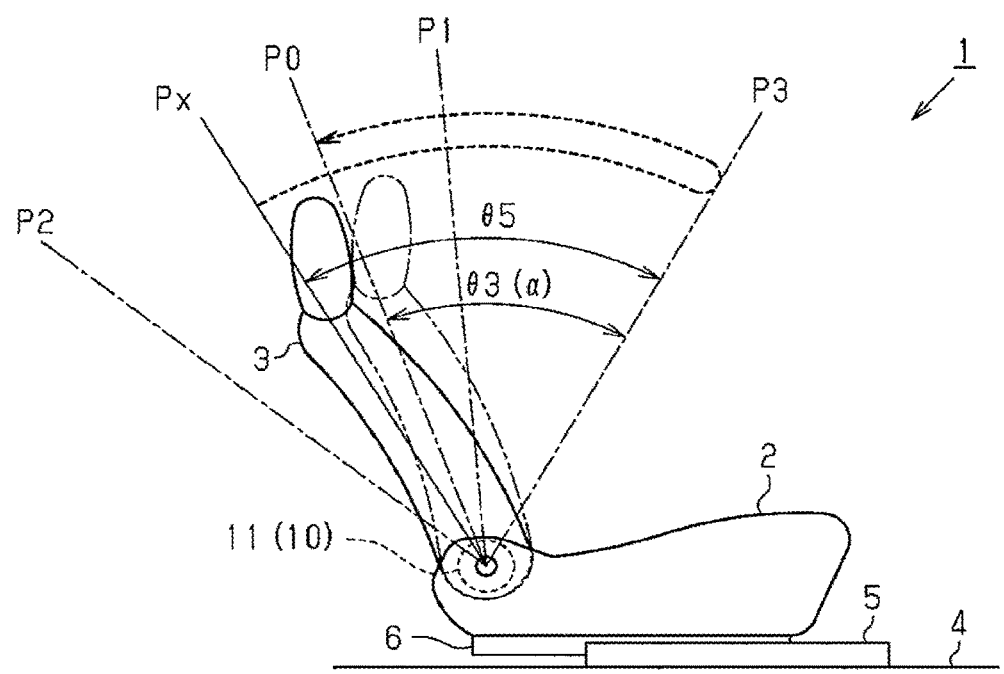
FIG. 17 is an explanatory diagram showing operation of the seat reclining device at the walk-in access enabling action in which the seat is inclined rearward.

In contrast, if the tilt position Px' of the seat back 3 before the forward folding operation is behind the basic position P0 as shown in FIG. 17, the tilt angle θ5 by which the seat back 3 reaches the maximum forward tilt position P3 through the forward folding operation is greater than the tilt angle θ3 from the basic position P0 to the maximum forward tilt position P3 (θ5>θ3). The tilt angle θ5 is greater than the relative rotation angle α between the first relative rotation position Q1 and the second relative rotation position Q2, which are set on the first memory member 61.

Thus, when the forward folding operation is started from such a rearward tilt state of the seat 1, the second memory member 62 contacts the second projection 77, and the second projection 77 functions as the stopper portion 78. This restricts integral rotation of the first rotating member 21 and the first memory member 61 due to the frictional engagement force. After the second projection 77 contacts the second memory member 62, the seat back 3 reaches the maximum forward tilt position P3 due to the force of the urging member 45, so that the relative rotation position of the first rotating member 21 and the first memory member 61 is adjusted.

Through the adjustment of the relative rotation position, the rotation angle of the first memory member 61 relative to the second rotating member 22 agrees with the relative rotation angle α set between the first relative rotation position Q1 and the second relative rotation position Q2. Therefore, the seat reclining device 10 is configured such that, when the seat back 3 is raised rearward after being folded forward, the seat back 3 returns to the basic position P0.

Coupling Structure of Link Member with Second Memory Member

Next, a structure by which the link member 64 is coupled to the second memory member 62 in the seat reclining device 10 of the present embodiment will be described.

As shown in FIGS. 2 to 6, the walk-in lever 50 of the operation mechanism 70, the connection lever 53, the coupling lever 58, and the link member 59 are arranged on the same side of the support plate 15 as the first memory member 61 (the right side as viewed in FIG. 6). The link member 64, which couples the walk-in lever 50 and the second memory member 62 to each other, is also arranged on the same side of the support plate 15 as the first memory member 61. That is, the walk-in lever 50, the connection lever 53, the coupling lever 58, and the link members 59, 64 are arranged on the inner side of the support plate 15 in the seat width direction.

Specifically, in the direction along the axis of the operation shaft 40 (the rotational axis L of the first and second rotating members 21, 22), the walk-in lever 50 and the connection lever 53 are located on the side of the first memory member 61, which is fitted to the first rotating member 21, and at positions farther from the support plate 15 than the first memory member 61 (on the right side as viewed in FIG. 6). The link member 64 is coupled to the second memory member 62 at a position adjacent to the first memory member 61 in the thickness direction of the support plate 15 (the lateral direction as viewed in FIG. 6).

Specifically, the link member 64 is coupled to the second memory member 62 at a position that is in the vicinity of an insertion portion 80 to be inserted into the engagement slot 65 of the first memory member 61 and farther from the support plate 15 than the insertion portion 80. In the present embodiment, the insertion portion 80 is formed by fitting a cylindrical member 81 to the shaft shaped main body of the second memory member 62. This allows the second memory member 62 to engage with and disengage from the first memory member 61 more accurately.

Figure 18:
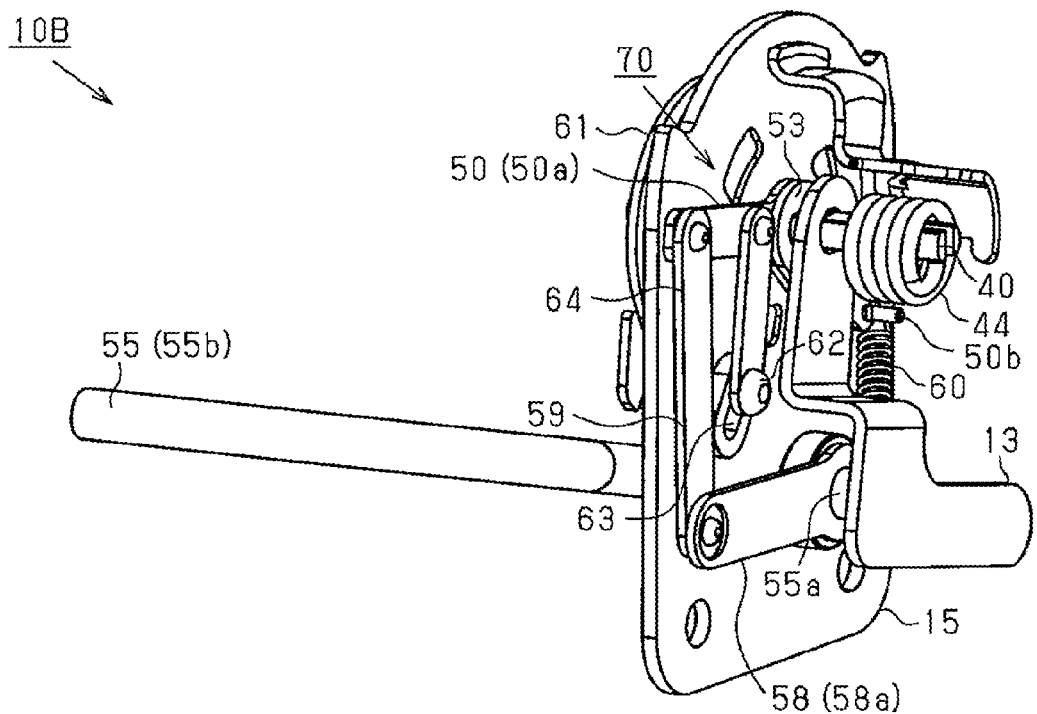
FIG. 18 is a perspective view of a seat reclining device shown of a comparative example.
Figure 19:
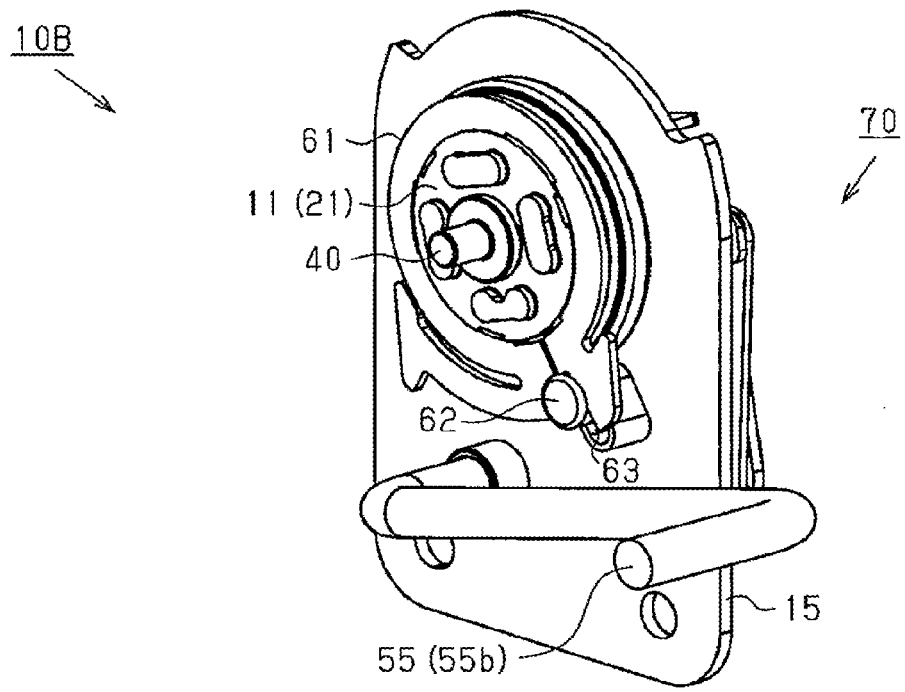
FIG. 19 is a perspective view of the seat reclining device shown in FIG. 18.
Figure 20:
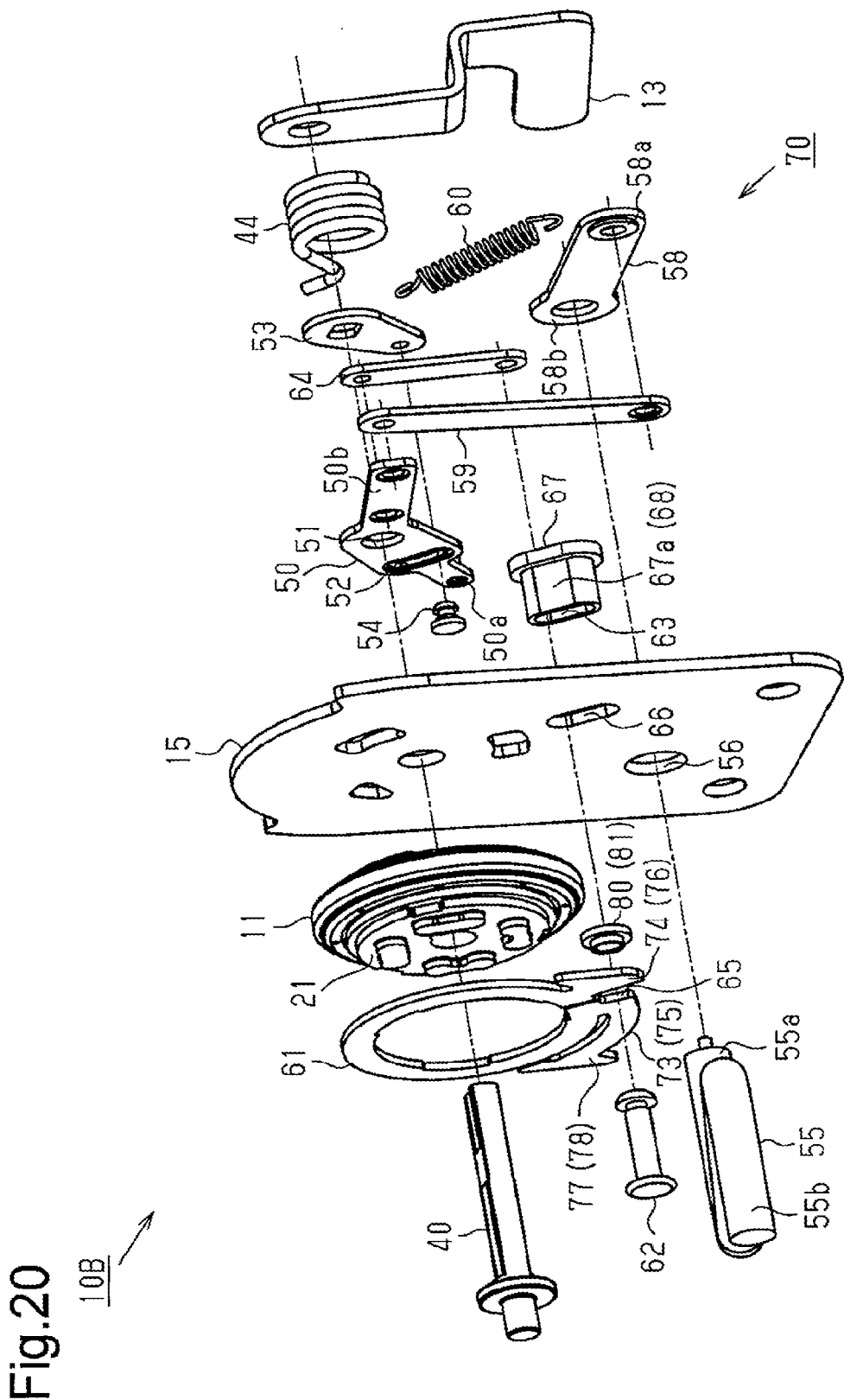
FIG. 20 is an exploded perspective view of the seat reclining device shown in FIG. 19.
Figure 21:
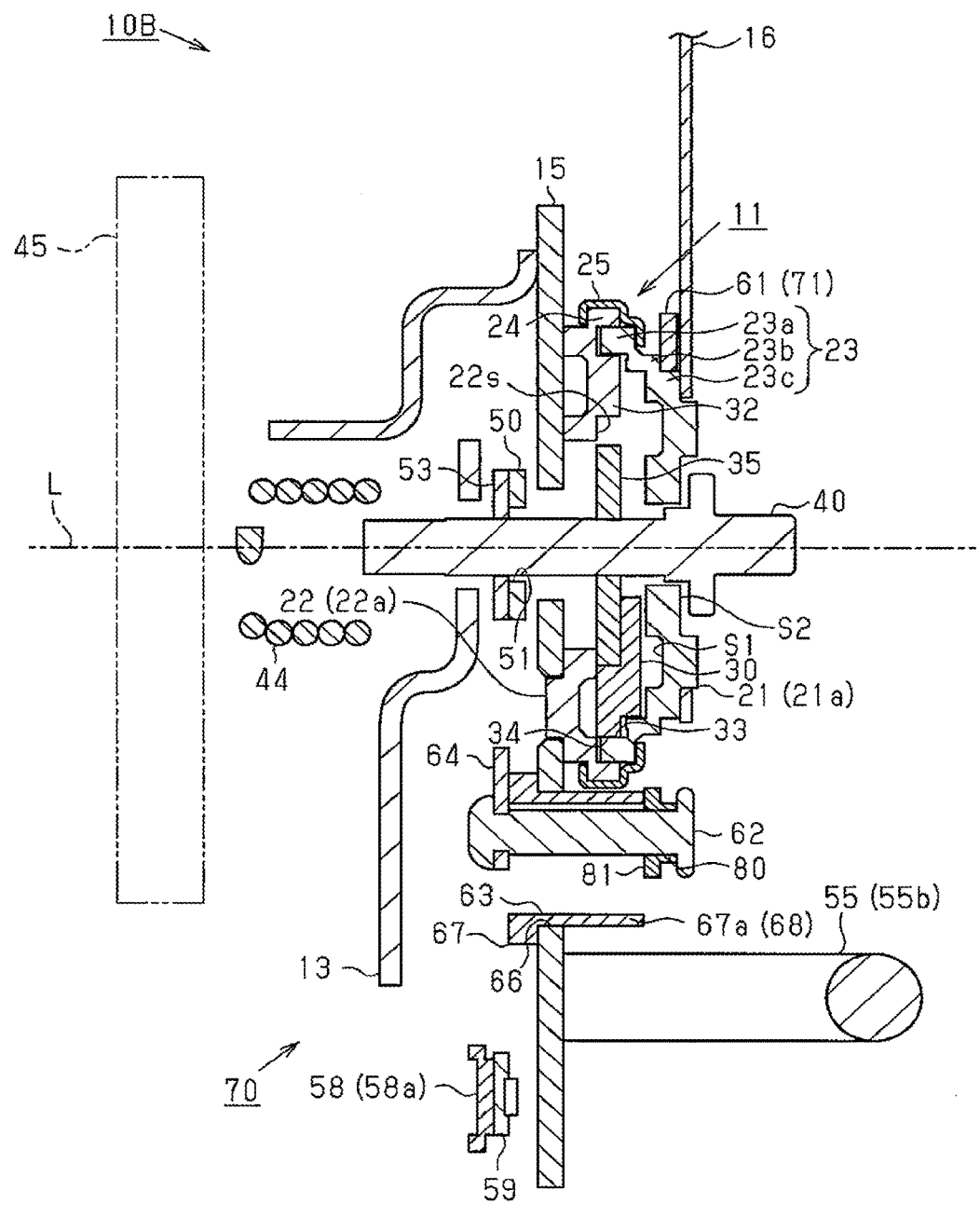
FIG. 21 is a cross-sectional view of the seat reclining device shown in FIG. 19.

That is, if the operation mechanism 70 is arranged on the opposite side of the support plate 15 from the first memory member 61 as in the case of a seat reclining device 10B of a comparative example illustrated in FIGS. 18 to 221, the part of the link member 64 that is connected to the second memory member 62 is spaced apart from the insertion portion 80 of the second memory member 62 at least by the distance corresponding to the thickness D0 of the support plate 15.

Figure 22A:
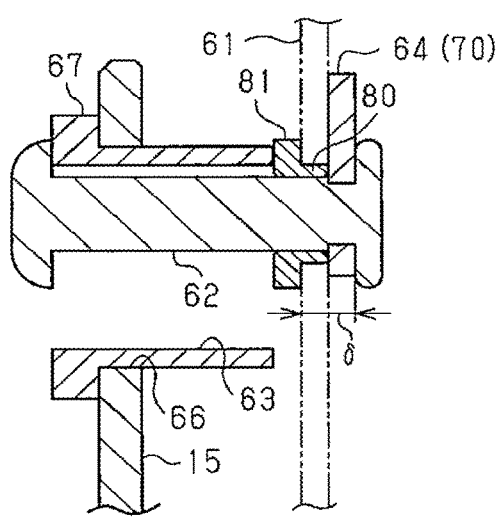
FIG. 22A is an enlarged cross-sectional view showing the second memory member and the surroundings of the embodiment.
Figure 22B:
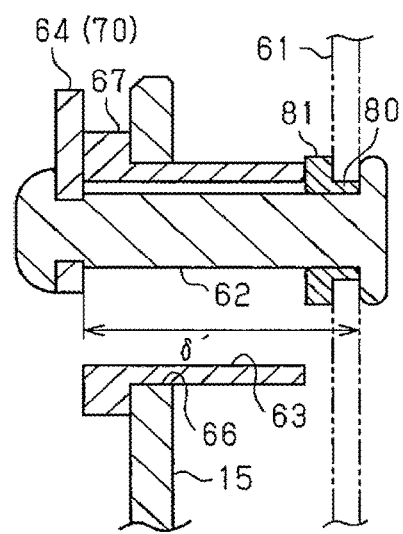
FIG. 22B is an enlarged cross-sectional view showing the second memory member and the surroundings of the comparative example.

However, by arranging the operation mechanism 70 on the same side of the support plate 15 as the first memory member 61 as shown in FIG. 22A (the right side as viewed in FIG. 22A), the distance δ between the insertion portion 80 of the second memory member 62 and the part of the link member 64 that is connected to the second memory member 62 is shorter than the corresponding distance δ' in the comparative example shown in FIG. 22B (δ<δ'). Thus, the seat reclining device 10 is capable of allowing the second memory member 62 to more accurately engage and disengage while limiting the influence of the tilting movement of the second memory member 62.

The present embodiment achieves the following advantages.

(1) The seat reclining device 10 includes the first rotating member 21, the second rotating member 22, which is arranged to be coaxial with the first rotating member 21, and the locking members 30, which restrict relative rotation between the first and second rotating members 21, 22. The seat reclining device 10 also includes the first memory member 61 and the second memory member 62. The first memory member 61 is allowed to frictionally engage with the outer surface S2 of the first rotating member 21 to rotate coaxially and integrally with the first rotating member 21 and is also allowed to rotate relative to the first rotating member 21 against the frictional engagement force. The second memory member 62 can be selectively engaged with and disengaged from the first memory member 61. Further, the seat reclining device 10 includes the operation mechanism 70, which causes the second memory member 62 to perform engaging/disengaging action and selectively locks and unlocks the locking members 30 in conjunction with the engaging/disengaging action. The first memory member 61 has the sliding surface 75. The sliding surface 75 slides on the second memory member 62 to restrict engaging action of the second memory member 62, which is accompanied by locking of the locking members 30. Further, the first memory member 61 has the engagement slot 65. When the first memory member 61 is at a certain relative rotation position (the first relative rotation position Q1) with respect to the second rotating member 22, the engagement slot 65 receives the second memory member 62 to allow the second memory member 62 to engage with the engagement slot 65. The engagement of the second memory member 62 with the engagement slot 65 restricts rotation of the first memory member 61 relative to the second rotating member 22.

With this configuration, even when the second memory member 62 is in the engagement slot 65 of the first memory member 61, the first rotating member 21 can be rotated relative to the second rotating member 22 against the frictional engagement force of the first memory member 61. Accordingly, the tilt angle of the seat back 3 can be adjusted through the normal reclining operation, which is not accompanied by engaging/disengaging action of the second memory member 62 with the first memory member 61.

When the second memory member 62 exits the engagement slot 65, the first memory member 61 is rotational integrally with the first rotating member 21 due to the frictional engagement force. That is, the first and second rotating members 21, 22 rotate relative to each other, so that the sliding surface 75 of the first memory member 61 slides along the second memory member 62. This restricts engaging action of the second memory member 62, which is accompanied by the locking of the locking members 30. As a result, the unlocked state is maintained, in which the tilt angle of the seat back 3 is not fixed. The seat back 3 is thus tilted to the maximum tilt position without continuing the unlocking operation using the operation mechanism 70.

Further, when the folded seat back 3 is raised, the first memory member 61, which rotates integrally with the first rotating member 21, is returned to the first relative rotation position Q1 in relation to the second rotating member 22, so that the second memory member 62 can enter the engagement slot 65. This allows for engaging action of the second memory member 62, which is accompanied by locking of the locking members 30, so that the tilt angle of the seat back 3 is fixed at the tilt position Px at which the seat back 3 was located before the folding operation.

The present embodiment is easier to assemble than a recliner-incorporated configuration, in which each memory member is arranged between the first and second rotating members 21, 22. Also, the present embodiment is highly flexible in the spatial arrangement and is thus advantageous in allowing for reduction in the thickness and accurate locking and unlocking.

(2) The sliding surface 75 is provided at the position that allows the first memory member 61 to rotate integrally with the first rotating member 21 to slide on the second memory member 62 due to the frictional engagement force when the seat back 3 is tilted forward with relative rotation between the first and second rotating members 21, 22.

With this configuration, the engaging action of the second memory member 62, which is accompanied by locking of the locking members 30, is restricted, and the unlocked state of the recliner 11 is maintained. Thus, the seat back 3 can be tilted to the maximum forward tilt position P3 without continuing the unlocking operation through the operation mechanism 70.

(3) The first memory member 61 includes the first projection 74. When the seat back 3 is tilted rearward with relative rotation between the first and second rotating members 21, 22, the first projection 74 contacts the second memory member 62 at the first relative rotation position Q1, where the second memory member 62 can enter the engagement slot 65. The first projection 74 functions as the first stopper portion 76 to restrict integral rotation of the first memory member 61 and the first rotating member 21 due to the frictional engagement force.

With this configuration, when the first memory member 61 reaches the first relative rotation position Q1, at which the second memory member 62 can enter the engagement slot 65, while the seat back 3, which has been folded forward, is being raised, the operator feels resistance (tactile sensation) due to the frictional engagement force. This indicates to the operator that the tilt angle of the seat back 3 can be fixed and thus ensures excellent operability.

When the first memory member 61 separates from the second memory member 62 while the locking members 30 are unlocked, the seat back 3 is restricted from being tilted rearward. This induces the forward folding of the seat back 3, thereby ensuring the walk-in function.

(4) The first memory member 61 includes the second projection 77. When the seat back 3 is tilted forward with relative rotation between the first and second rotating members 21, 22, the second projection 77 contacts the second memory member 62 at the second relative rotation position Q2, which is shifted by the predetermined relative rotation angle $\alpha$ from the first relative rotation position Q1. The second projection 77 functions as the second stopper portion 78 to restrict integral rotation of the first memory member 61 and the first rotating member 21 due to the frictional engagement force.

That is, even after the second memory member 62 contacts the second projection 77 due to forward folding operation of the seat back 3, the first rotating member 21 can be rotated relative to the second rotating member 22 against the frictional engagement force. Thus, with the above configuration, when the forward folded seat back 3 reaches the maximum forward tilt position P3 after the second memory member 62 contacts the second projection 77, the relative rotation position between the first rotating member 21 and the first memory member 61 is adjusted. Accordingly, the relative rotation angle between the first memory member 61 and the second rotating member 22 agrees with the predetermined relative rotation angle $\alpha$, which is set between the first relative rotation position Q1 and the second relative rotation position Q2. This causes the seat back 3, which has been raised from the maximum forward tilt position P3, to be returned to a predetermined tilt position that corresponds to the relative rotation angle $\alpha$.

That is, the predetermined relative rotation angle $\alpha$ is set to be equal to the tilt angle $\theta 3$, which is from the basic position P0 of the seat back 3 to the maximum forward tilt position P3. Thus, when the seat back 3 starts being folded forward from the tilt position Px, which is forward of the basic position P0, the seat back 3 is returned to the tilt position Px, at which the seat back 3 was located before the forward folding of the seat back 3. When the seat back 3 starts being folded forward from the tilt position Px', which is behind the basic position P0, the seat back 3, which has been raised from the maximum forward tilt position P3, is returned to the basic position P0. The raised seat back 3 does not contact the occupant sitting in the rear seat, which improves convenience of the seat reclining device 10.

(5) The seat back 3 is urged forward by the urging member 45. The frictional engagement force of the first memory member 61 acting on the first rotating member 21 is set such that the first and second rotating members 21, 22 rotate relative to each other due to the urging force of the urging member 45 even after the second memory member 62 contacts the second projection 77, which constitutes the stopper portion 78.

With the above configuration, the seat back 3 can be more easily folded forward. Also, the seat back 3 is allowed to reach the maximum forward tilt position P3 due to the urging force of the urging member 45 after the second memory member 62 contacts the second projection 77. This allows the forward folded seat back 3 to be stably returned to the basic position P0.

(6) The second rotating member 22 is fixed to the support plate 15, which is a plate-shaped member. The operation mechanism 70 includes the guide hole 63 and the link member 64. The guide hole 63 is an elongated hole provided in the support plate 15. The link member 64 is coupled to the second memory member 62, which is inserted in the guide hole 63. The link member 64 is arranged on the same side of the support plate 15 as the first memory member 61.

The above configuration shortens the distance δ between the insertion portion 80 of the second memory member 62 and the part of the link member 64 that is connected to the second memory member 62. This limits the influence of tilting action of the second memory member 62. As a result, accurate engagement and disengagement of the second memory member 62 are ensured. In addition, the thickness of the recliner 11 can be reduced.

(7) The link member 64 is coupled to the second memory member 62 at a position adjacent to the first memory member 61 in the thickness direction of the support plate 15. This configuration effectively limits the influence of tilting action of the second memory member 62.

(8) The support plate 15 is fixed to the side frame 14, which constitutes the framework of the seat cushion 2. The link member 64 is arranged on the inner side of the support plate 15 in the width direction of the seat 1. With this structure, the support plate 15 protects the link member 64 (and the levers 50, 53, which constitute the operation mechanism 70). This ensures smooth movements of the operation mechanism 70.

The above illustrated embodiment may be modified as follows.

In the above illustrated embodiment, it is possible to cause the seat back 3 to take the walk-in access enabling action from behind the seat 1 by manipulation of the foot lever 57, which can be stepped on. However, the seat back 3 may be caused to take the walk-in access enabling action by, for example, manipulation of a walk-in handle at the upper end (the shoulder) of the seat back 3. The position and shape of the manipulation input portion of the operation mechanism 70 may be changed as necessary.

In the above illustrated embodiment, manipulation of the foot lever 57 is transmitted to the walk-in lever 50 via the connection lever 53, the coupling lever 58, and the link member 59. However, without such a link mechanism, the manipulation may be transmitted using a wire cable.

In the above illustrated embodiment, the first memory member 61 includes the frictional engagement portion 71, which has an annular shape with a discontinuous section (a C-ring shape). However, the shape of the first memory member 61 may have any suitable shape such as an annular shape without a cut. A friction ring may be arranged between the first memory member 61 and the first rotating member 21.

The engagement slot 65 is defined by the side wall surfaces 65s on the first end 71a and the second end 71b of the frictional engagement portion 71, which are opposed to each other with the cut 71x in between. However, the position of the engagement slot 65 may be changed as necessary in the first memory member 61.

The first memory member 61 includes the first projection 74 and the second projection 77. The first and second projections 74, 77 contact the second memory member 62 and function as the stopper portions 76, 78, thereby restricting integral rotation of the first rotating member 21 and the first memory member 61 due to the frictional engagement force. However, the first memory member 61 may have only one of the stopper portions 76, 78. The first memory member 61 may include neither of the stopper portions 76, 78.

The sliding surface 75 may be formed not only at the position that slides on the second memory member 62 when the seat back 3 is folded forward, but also at a position that slides on the second memory member 62 when the seat back 3 is tilted rearward. Also, the sliding surface 75 may be formed only at a position that slides on another component when the seat back 3 is tilted rearward. This configuration is suitable for a flat seat, which allows the seat back 3 to be tilted rearward until it becomes substantially level with the seat cushion 2.

In the above illustrated embodiment, the circumferential wall portion 24 of the second rotating member 22 is located at the outermost positions in the radial direction of the first and second rotating members 21, 22. The circumferential wall portion 23 of the first rotating member 21 is not level with the circumferential wall portion 24. The first memory member 61 is fitted to the circumferential wall portion 23 of the first rotating member 21, more specifically, to the third circumferential wall portion 23c. However, the first memory member 61 may be fitted to the first circumferential wall portion 23a, which has an inner circumference with the inner teeth 33, or the second circumferential wall portion 23b, which has an inner circumference with the control projections 41. Also, the circumferential wall portion 23 of the first rotating member 21 may be arranged at the outermost positions in the radial direction of the first and second rotating members 21, 22, and the first memory member 61 may be fitted to the circumferential wall portion 23.

A coupling member such as the annular holder 25 between the first and second rotating members 21, 22 may be fixed to the first rotating member 21. Alternatively, the first rotating member 21 may be fixed to the seat back 3 via a fixing member. In these cases, such a coupling member or fixing member may be part of the first rotating member 21. Further, when a retaining member is used that is fixed to the seat back 3 (for example, to the seat back side member 16) and arranged coaxially with the first rotating member 21, the retaining member may be part of the first rotating member 21. In these cases, the first memory member 61 may be fitted to the outer periphery of the coupling member, the fixing member, or the retaining member.

In the above illustrated embodiment, the inner teeth 33 and the control projections 41 are provided on the inner circumference of the circumferential wall portion 23 of the first rotating member 21, which is fixed to the seat back 3. The second rotating member 22, which is fixed to the seat cushion 2, includes the guide portions 31, which hold the locking members 30 to be movable radially inward of the circumferential wall portion 24. However, the reclining device may include a first rotating member, which holds locking members on the radially inner side of the circumferential wall portion, and a second rotating member, which has inner teeth and control projections on the inner circumference of the circumferential wall portion. That is, the recliner 11 may be arranged between the seat cushion 2 and the seat back 3 with the front and back reversed from the recliner 11 of the above illustrated embodiment. In this case also, the first memory member 61 is configured to frictionally engage with the first rotating member 21.

In the above illustrated embodiment, the second memory member 62 enters or exits the engagement slot 65 by moving in the radial direction of the first memory member 61 (the recliner 11). However, the insertion direction (or the exit direction) of the second memory member 62 does not necessarily need to agree with the radial direction of the first memory member 61. Also, the insertion direction does not necessarily need to agree with the direction toward the rotation center of the first memory member 61. Further, the path of the second memory member 62 when engaging with or disengaging from the first memory member 61 does not need to be straight, but may be arcuately curved. The side wall surfaces 65s of the engagement slot 65 may be curved such that the insertion direction of the second memory member 62 changes gradually after the second memory member 62 starts entering the engagement slot 65.

The invention claimed is:

1. A seat reclining device for a vehicle, comprising:
    a first rotating member;
    a second rotating member that is arranged coaxial with the first rotating member;
    a plate-shaped member to which the second rotating member is fixed;
    a locking member that restricts relative rotation between the first rotating member and the second rotating member;
    a first memory member that is capable of rotating coaxially and integrally with the first rotating member by frictionally engaging with an outer surface of the first rotating member and capable of rotating relative to the first rotating member against frictional engagement force between the first memory member and the first rotating member;
    a second memory member that is capable of engaging with and disengaging from the first memory member; and
    an operation mechanism that causes the second memory member to engage with and disengage from the first memory member and selectively locks and unlocks the locking member in conjunction with the engagement and disengagement, wherein
    the first memory member includes
        a sliding surface that, by sliding on the second memory member, restricts engaging action of the second memory member that is accompanied by the locking of the locking member, and
        an engagement slot, into which the second memory member can enter, wherein, when the first memory member is at a predetermined relative rotation position with respect to the second rotating member, the second memory member is inserted into the engagement slot so that engaging action of the second memory member is allowed, thereby restricting relative rotation of the first memory member with respect to the second rotating member,
    the operation mechanism includes
        an elongated guide hole provided in the plate-shaped member, and
        a link member that is coupled to the second memory member inserted in the guide hole, and
    the link member is arranged on the same side of the plate-shaped member as the first memory member in a thickness direction of the plate-shaped member.

2. The seat reclining device for a vehicle according to claim 1, wherein the link member is coupled to the second memory member at a position adjacent to the first memory member in the thickness direction of the plate-shaped member.

3. The seat reclining device for a vehicle according to claim 1, wherein the first memory member includes a stopper portion, and, when a seat back is tilted rearward with relative rotation between the first and second rotating members, the stopper portion contacts the second memory member at the predetermined relative rotation position, thereby restricting integral rotation of the first rotating member and the first memory member due to the frictional engagement force.

4. The seat reclining device for a vehicle according to claim 1, wherein
    the predetermined relative rotation position is a first relative rotation position, and
    the first memory member includes a second stopper portion, and, when a seat back is tilted forward with relative rotation between the first and second rotating members, the second stopper portion contacts the second memory member at a second relative rotation position, which is separated from the first relative rotation position by a predetermined relative rotation angle, thereby restricting integral rotation of the first rotating member and the first memory member due to the frictional engagement force.

5. The seat reclining device for a vehicle according to claim 4, wherein
    the seat back is configured to be urged forward by an urging member, and
    the frictional engagement force between the first rotating member and the first memory member is set such that the first and second rotating members are caused to rotate relative to each other by the force of the urging member after the second stopper portion contacts the second memory member.

6. The seat reclining device for a vehicle according to claim 1, wherein the sliding surface is formed at a position where, when a seat back is tilted forward with relative rotation between the first and second rotating members, the first memory member and the first rotating member rotate integrally due to the frictional engagement force, so that the sliding surface slides on the second memory member.

7. The seat reclining device for a vehicle according to claim 1, wherein
    the plate-shaped member is fixed to a side frame, which constitutes a framework of a seat cushion of a seat, and
    the link member is arranged on the inner side of the plate-shaped member in a width direction of the seat.

* * * * *